(12) United States Patent
Choi et al.

(10) Patent No.: US 11,134,435 B2
(45) Date of Patent: Sep. 28, 2021

(54) ELECTRONIC DEVICE SUPPORTING MULTIPLE WIRELESS COMMUNICATION PROTOCOLS AND METHOD THEREFOR

(71) Applicant: Samsung Electronics Co., Ltd., Suwon-si (KR)

(72) Inventors: Jongmu Choi, Suwon-si (KR); Dayeong Choi, Suwon-si (KR); Junyoung Park, Suwon-si (KR); Bokun Choi, Suwon-si (KR); Seongyu Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/431,040

(22) Filed: Jun. 4, 2019

(65) Prior Publication Data

US 2019/0373541 A1 Dec. 5, 2019

(30) Foreign Application Priority Data

Jun. 4, 2018 (KR) .......................... 10-2018-0064215

(51) Int. Cl.
*H04W 48/18* (2009.01)
*G06F 3/0481* (2013.01)
(Continued)

(52) U.S. Cl.
CPC .......... *H04W 48/18* (2013.01); *G06F 3/0481* (2013.01); *G06F 3/0482* (2013.01);
(Continued)

(58) Field of Classification Search
None
See application file for complete search history.

(56) References Cited

U.S. PATENT DOCUMENTS

| 8,228,861 B1 | 7/2012 | Nix |
| 8,792,448 B2 | 7/2014 | Nix |

(Continued)

FOREIGN PATENT DOCUMENTS

| GB | 2 545 930 A | 7/2017 |
| KR | 10-1689718 B1 | 10/2016 |
| WO | 2017/044444 A1 | 3/2017 |

OTHER PUBLICATIONS

International Search Report with Written Opinion dated Sep. 19, 2019; International Appln. No. PCT/KR2019/006725.
(Continued)

*Primary Examiner* — Saumit Shah
(74) *Attorney, Agent, or Firm* — Jefferson IP Law, LLP

(57) ABSTRACT

An electronic device is provided. The electronic device includes a first wireless communication circuit communicating with a first wireless network based on a first communication protocol, a second wireless communication circuit communicating with a second wireless network based on a second communication protocol, a display, a processor, and a memory. The memory stores instructions that cause the processor to connect to the first wireless network using the first wireless communication circuit, obtain service restriction information associated with the first wireless network, determine whether a service associated with data is restricted in the first wireless network using the service restriction information, and maintain a connection to the first wireless network to transmit the data over the second wireless communication network using the second wireless communication circuit when the service associated with the data is restricted in the first wireless network.

13 Claims, 16 Drawing Sheets

(51) Int. Cl.
    *H04W 88/06*     (2009.01)
    *G06F 3/0482*     (2013.01)
    *H04W 80/06*     (2009.01)

(52) U.S. Cl.
    CPC ............ *G06F 3/04817* (2013.01); *G06F 2203/04803* (2013.01); *H04W 80/06* (2013.01); *H04W 88/06* (2013.01)

(56) References Cited

U.S. PATENT DOCUMENTS

| | | | |
|---|---|---|---|
| 8,934,336 | B2 | 1/2015 | Ramachandran et al. |
| 9,516,688 | B2 | 12/2016 | Konstantinou et al. |
| 9,549,429 | B1 | 1/2017 | Gudell et al. |
| 9,934,064 | B2 | 4/2018 | Kekeh et al. |
| 9,992,723 | B2 | 6/2018 | Katar et al. |
| 2005/0259634 | A1 | 11/2005 | Ross |
| 2012/0167117 | A1 | 6/2012 | Kekeh et al. |
| 2012/0236709 | A1 | 9/2012 | Ramachandran et al. |
| 2013/0170471 | A1 | 7/2013 | Nix |
| 2013/0237220 | A1 | 9/2013 | Lee et al. |
| 2014/0198698 | A1* | 7/2014 | Kristiansson ..... H04W 52/0229 370/311 |
| 2015/0163811 | A1 | 6/2015 | Konstantinou et al. |
| 2015/0271317 | A1* | 9/2015 | Nelson ............ H04M 1/724 715/753 |
| 2015/0350983 | A1 | 12/2015 | Kwok et al. |
| 2016/0021603 | A1* | 1/2016 | Mueck ............ H04W 48/16 455/418 |
| 2016/0080958 | A1* | 3/2016 | Rinne ............ H04W 24/10 370/338 |
| 2016/0353334 | A1* | 12/2016 | Kim ............ H04W 28/0236 |
| 2017/0177409 | A1 | 6/2017 | Kekeh et al. |
| 2017/0245190 | A1 | 8/2017 | Katar et al. |
| 2019/0132353 | A1* | 5/2019 | Rodniansky ........ H04L 63/0227 |

OTHER PUBLICATIONS

Extended European Search Report dated Apr. 15, 2021, issued in European Patent Application No. 19814830.6.

* cited by examiner

ELECTRONIC DEVICE SUPPORTING MULTIPLE WIRELESS COMMUNICATION PROTOCOLS AND METHOD THEREFOR

CROSS-REFERENCE TO RELATED APPLICATION(S)

This application is based on and claims priority under 35 U.S.C. § 119(a) of a Korean patent application number 10-2018-0064215, filed on Jun. 4, 2018, in the Korean Intellectual Property Office, the disclosure of which is incorporated by reference herein in its entirety.

BACKGROUND

1. Field

The disclosure relates to an electronic device supporting multiple wireless communication protocols and a method therefor.

2. Description of Related Art

An electronic device may transmit data associated with an application over a network. For example, the electronic device may transmit the data in the form of a packet. The packet may include port information. The port information may indicate the type of specified process or network service. For example, the port information may be included in the header of a protocol data unit (PDU) according to a transport layer protocol such as transmission control protocol (TCP) or user datagram protocol (UDP).

Due to security policy, billing, or the like, a specific port may be blocked in the wireless network. For example, the firewall of a corporate network (e.g., Intranet) operated by a company may block a port corresponding to a messenger application for security. In this case, for the purpose of using the messenger application, a user needs to disconnect with the pre-connected corporate network and to select another network (e.g., a cellular network). Accordingly, the user of the electronic device may experience connection loss due to releasing of the pre-connection and connecting to another network. Furthermore, when only some ports are restricted in a network, which is already connected with the electronic device, it is difficult for the user to understand why a specific application does not operate normally.

When some ports are blocked in the connected wireless network, an electronic device may need to be disconnected from the connected wireless network and then connect with another wireless network to use an application corresponding to the blocked port. Accordingly, even though a service corresponding to another port unblocked in the connected wireless network is available, the electronic device needs to use the service using another network bearer. Moreover, the user may fail to appropriately cope with the case where data transmission fails because some ports are blocked in the wireless network.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide an apparatus and method to connect to and obtain service restriction information associated with a first wireless network, determine whether a service associated with data is restricted in the first wireless network, and maintain a connection to the first wireless network to transmit the data over a second wireless communication network when the service associated with the data is restricted in the first wireless network.

In various embodiments of the disclosure, an electronic device may obtain port restriction information of the connected network. While maintaining a connection to the connected network by using the port restriction information, the electronic device may transmit data corresponding to a specific port using a new network bearer.

In various embodiments of the disclosure, the electronic device may provide a user with a proper notification using the port restriction information.

Additional aspects will be set forth in part in the description which follows and, in part, will be apparent from the description, or may be learned by practice of the presented embodiments.

In accordance with an aspect of the disclosure, an electronic device is provided. The electronic device includes a first wireless communication circuit communicating with a first wireless network based on a first communication protocol, a second wireless communication circuit communicating with a second wireless network based on a second communication protocol, a display, a processor operatively connected to the first wireless communication circuit, the second wireless communication circuit, and the display, and a memory electrically connected to the processor. The memory may store instructions that cause the processor to connect to the first wireless network using the first wireless communication circuit, obtain service restriction information associated with the first wireless network, determine whether a service associated with data is restricted in the first wireless network using the service restriction information, and maintain a connection to the first wireless network to transmit the data over the second wireless communication network using the second wireless communication circuit when the service associated with the data is restricted in the first wireless network.

In accordance with another aspect of the disclosure, a data transmitting method of an electronic device is provided. The data transmitting method includes connecting to a first wireless network using a first wireless communication circuit of the electronic device supporting a first wireless communication protocol, obtaining service restriction information associated with the first wireless network, determining whether a service associated with data is restricted in the first wireless network using the service restriction information, and when the service associated with the data is restricted in the first wireless network, maintaining a connection to the first wireless network to transmit the data over a second wireless network by using a second wireless communication circuit of the electronic device supporting a second wireless communication protocol.

In accordance with another aspect of the disclosure, an electronic device is provided. The electronic device includes a first wireless communication circuit communicating with a first wireless network based on a first communication protocol, a second wireless communication circuit communicating with a second wireless network based on a second communication protocol, a display, a memory, and a processor operatively connected to the first wireless communication circuit, the second wireless communication circuit, the display, and the memory. The processor may be configured to connect to the first wireless network using the first wireless communication circuit when being connected to the first wireless network, display a first user interface (UI) corresponding to the first wireless network on at least part of the display, and to determine whether a service associated with data to be transmitted is restricted in the first wireless network using service restriction information associated with the first wireless network. When the service associated with the data is restricted in the first wireless network, the processor may be further configured to maintain a connection to the first wireless network and transmit the data over the second wireless communication network by using the second wireless communication circuit and while transmitting the data over the second network, display a second UI corresponding to the second wireless network on at least part of the display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
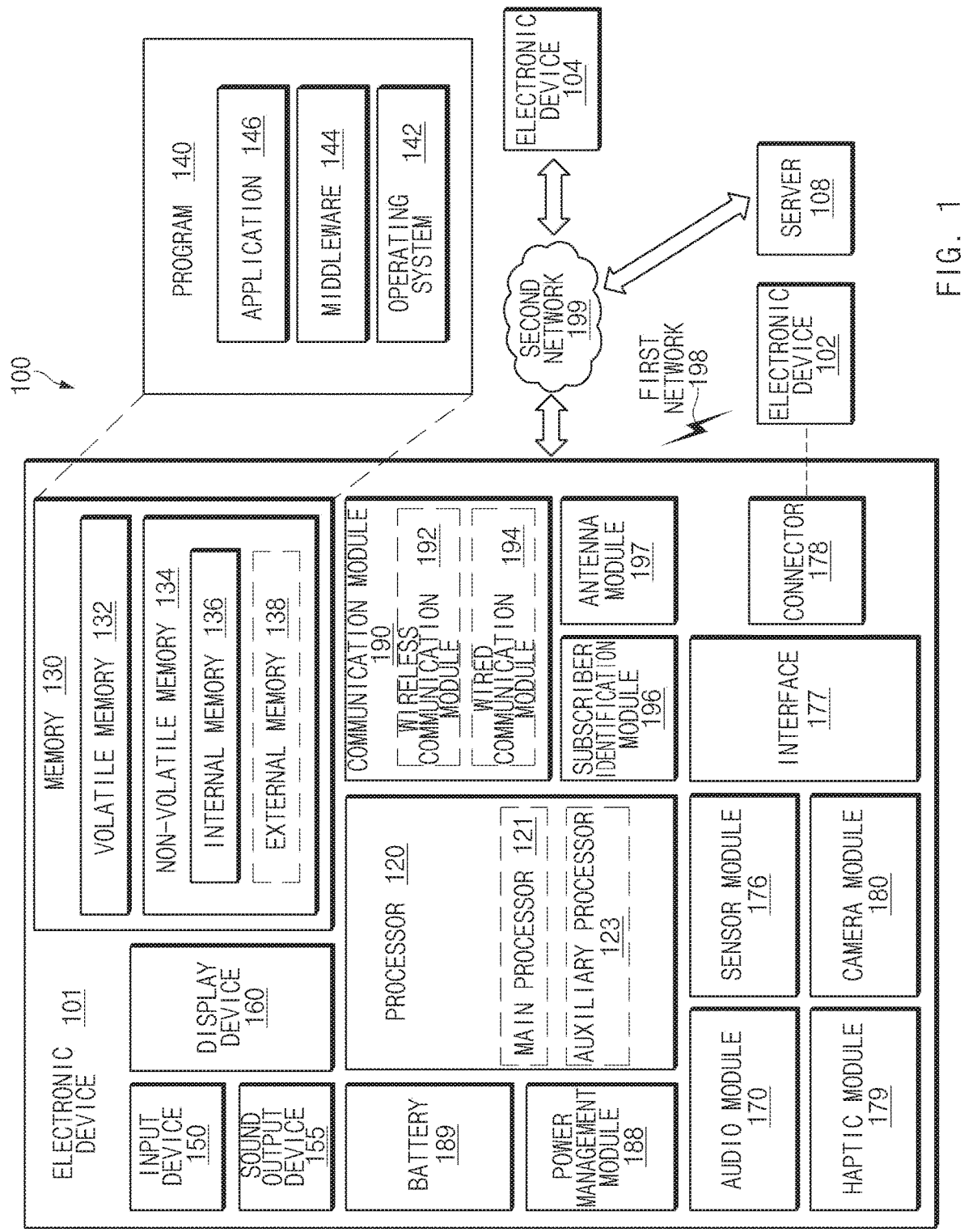
FIG. 1 illustrates a block diagram of an electronic device in a network according to various embodiments of the disclosure.

FIG. 1 is a block diagram illustrating an electronic device in a network environment according to various embodiments of the disclosure.

Referring to FIG. 1, an electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 or external memory 138.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
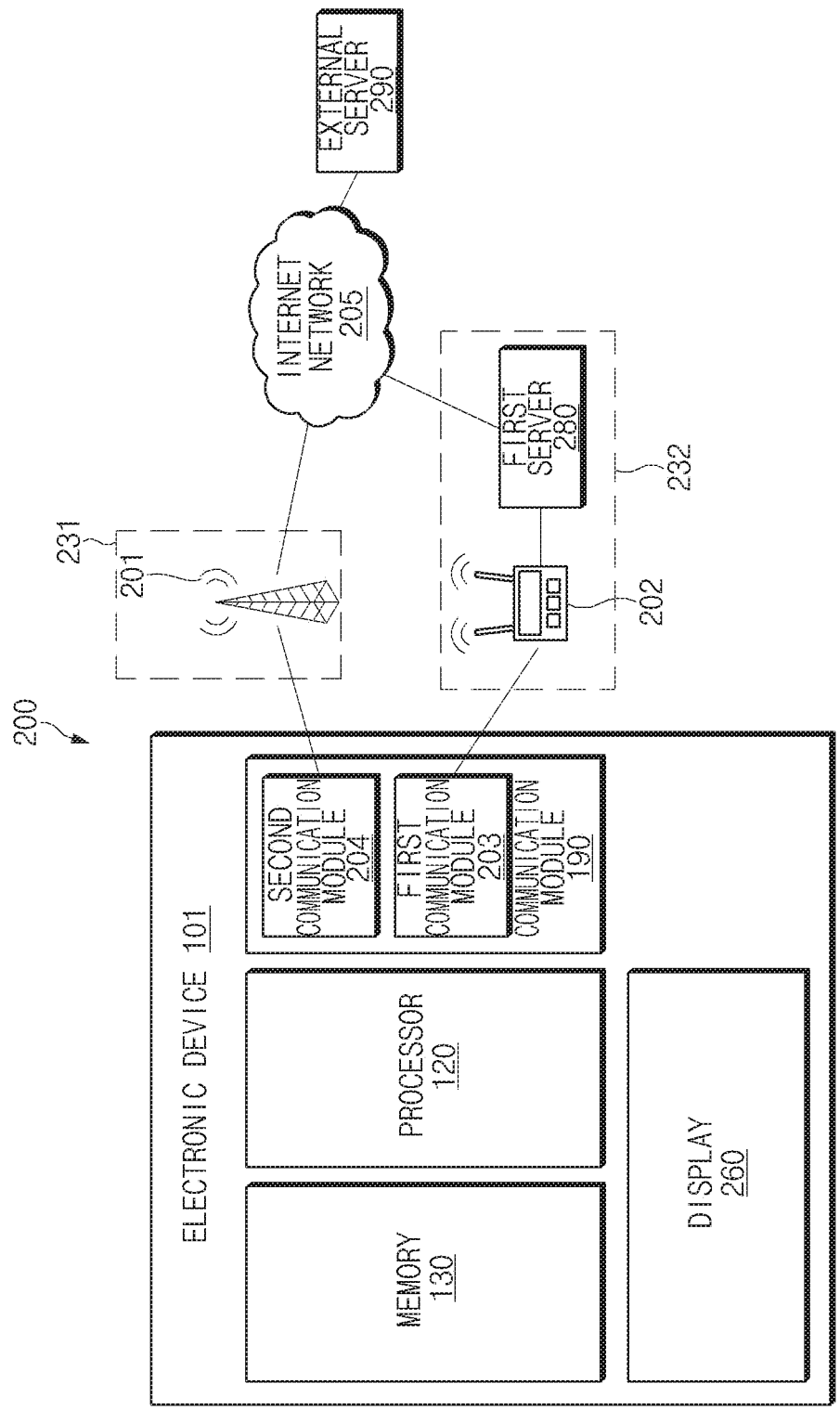
FIG. 2 illustrates a block diagram of an electronic device in various wireless network environments according to an embodiment of the disclosure.

FIG. 2 illustrates a block diagram of an electronic device in various wireless network environments according to an embodiment of the disclosure.

Referring to FIG. 2, according to various embodiments, the electronic device 101 in a wireless network environment 200 may include the processor 120, the memory 130, the communication module 190, and a display 260 (e.g., the display device 160 of FIG. 1). For example, the processor 120 may be operatively connected to the memory 130, the communication module 190, and the display 260 and may be configured to control the operations of the memory 130, the communication module 190, and the display 260. According to an embodiment, the memory 130 may include instructions for controlling the operation of the processor 120. For example, the memory 130 may store service restriction information associated with at least one access point (AP).

According to various embodiments, the communication module 190 may include a plurality of communication circuits supporting different network protocols. For example, the communication module 190 may include a first communication module 203 supporting a first communication protocol and a second communication module 204 supporting a second communication protocol different from the first communication protocol. According to an embodiment, the electronic device 101 may communicate with the Wi-Fi network 232 (e.g., institute of electrical and electronics engineers (IEEE) network), using the first communication module 203. According to an embodiment, the electronic device 101 may be connected to a first access point (AP) 202 of the Wi-Fi network 232, and may communicate with a first server 280 associated with the first AP 202 and an external server 290 over an Internet network 205. According to an embodiment, the electronic device 101 may also communicate with a cellular network 231 (e.g., $3^{rd}$ generation partnership project (3GPP) network), using the second communication module 204. According to an embodiment, the electronic device 101 may be connected to a base station 201 of the cellular network 231 and may communicate with the external server 290 via the base station 201 and an Internet network 205.

According to various embodiments, the electronic device 101 may be connected to the cellular network 231 and the Wi-Fi network 232 simultaneously or substantially. According to an embodiment, the electronic device 101 may connect to the Wi-Fi network 232 as a main network and may connect to the cellular network 231 as a backup network. According to an embodiment, the electronic device 101 may connect to the cellular network 231 as the main network and may connect to the Wi-Fi network 232 as the backup network. For example, when it is impossible to transmit data over the main network, the electronic device 101 may transmit data over the backup network.

According to various embodiments, the electronic device 101 may obtain service restriction information associated with at least one wireless network. For example, the service restriction information may include information about a service (e.g., the blocked port) restricted in the corresponding wireless network. According to an embodiment, the electronic device 101 may obtain the service restriction information associated with the cellular network 231 and/or the Wi-Fi network 232. For example, the electronic device 101 may receive the service restriction information from the cellular network 231. For another example, the electronic device 101 may obtain the service restriction information through port scanning of the Wi-Fi network 232. For another example, the electronic device 101 may receive the service restriction information from another electronic device (not illustrated) or another server (not illustrated). According to an embodiment, the electronic device 101 may display a user interface (UI) indicating service restriction information, on the display 260. According to an embodiment, the electronic device 101 may store the obtained service restriction information in the memory 130 or may transmit the obtained service restriction information to another electronic device and/or another server.

According to various embodiments, the electronic device 101 may be connected to the cellular network 231. According to an embodiment, the electronic device 101 may display a UI indicating that the electronic device 101 is connected to the cellular network 231, on the display 260. The electronic device 101 may attempt to transmit data associated with the specified application, and the service associated with data transmission may be restricted in the cellular network 231. For example, the port associated with data transmission may be blocked in the cellular network 231. According to an embodiment, the electronic device 101 may transmit data restricted in the cellular network 231, over the Wi-Fi network 232. For example, while maintaining the connection to the cellular network 231, the electronic device 101 may transmit data associated with the restricted service, over the Wi-Fi network 232. According to an embodiment, when the data to be transmitted is associated with the restricted service, the electronic device 101 may display a UI indicating that information about the restricted service and/or data associated with the restricted service is transmitted or received over the Wi-Fi network 232, on the display 260. For example, the electronic device 101 may display a UI indicating that data is transmitted or received over the Wi-Fi network 232, on the display 260.

According to another embodiment, the electronic device 101 may be connected to the Wi-Fi network 232. According to an embodiment, the electronic device 101 may display a UI indicating that the electronic device 101 is connected to the Wi-Fi network 232, on the display 260. The electronic device 101 may attempt to transmit the data associated with a specified application. For example, the service associated with the data to be transmitted may be restricted in the Wi-Fi network 232. For example, the port associated with the data may be blocked in the Wi-Fi network 232. In this case, according to an embodiment, the electronic device 101 may transmit the data associated with the specified application over the cellular network 231. For example, while maintaining the connection to the Wi-Fi network 232, the electronic device 101 may transmit data associated with the restricted service, over the cellular network 231. According to an embodiment, when the data to be transmitted is associated with the restricted service, the electronic device 101 may display a UI indicating that information about the restricted service and/or data associated with the restricted service is transmitted over the cellular network 231, on the display 260. For example, the electronic device 101 may display a UI indicating that data is transmitted or received over the cellular network 231, on the display 260.

Figure 3:
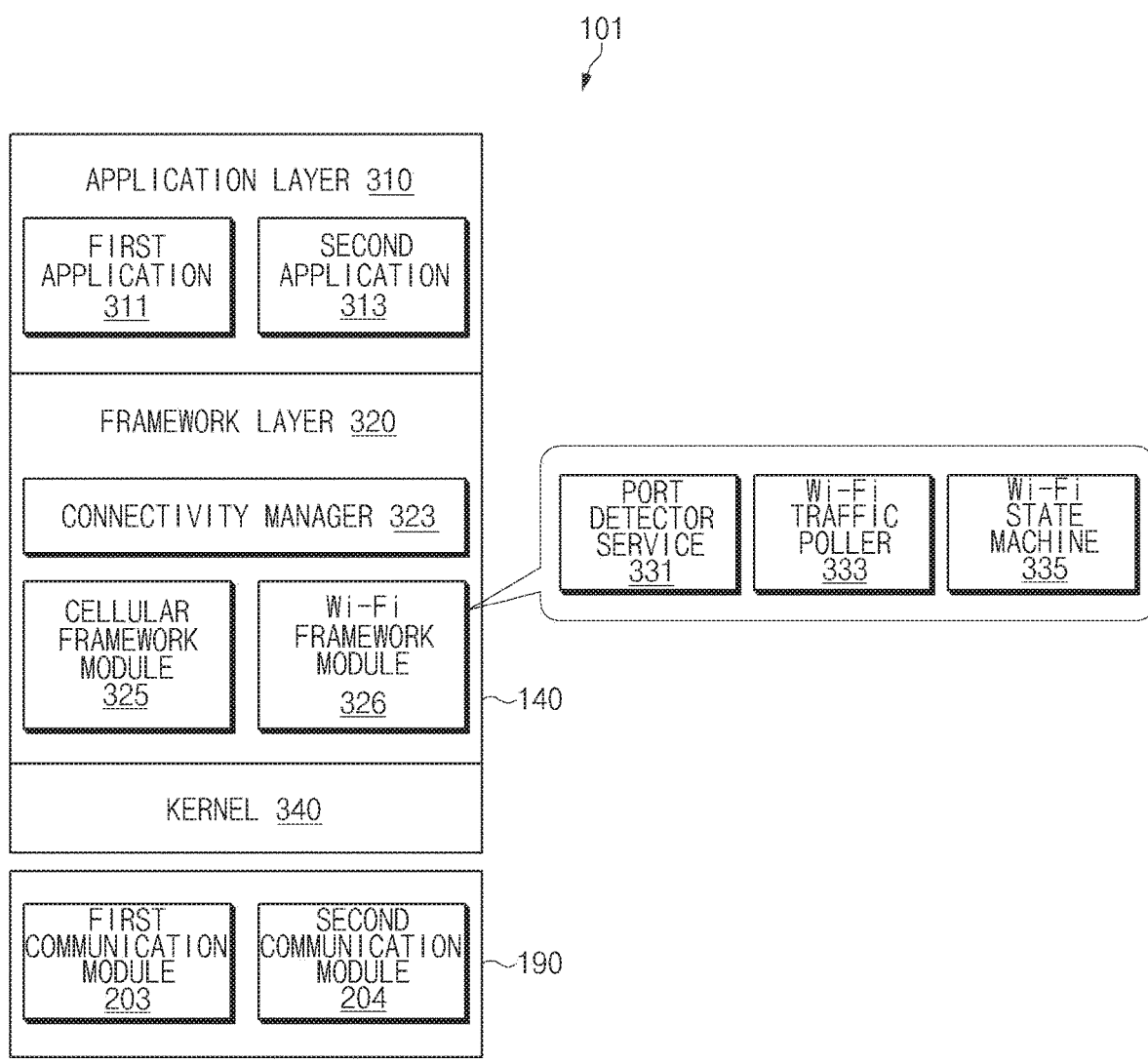
FIG. 3 illustrates a structure of layers processing a data packet according to various embodiments of the disclosure.

FIG. 3 illustrates a structure of layers processing a data packet according to various embodiments of the disclosure.

Referring to FIG. 3, when instructions stored in the memory 130 is executed by the processor 120, data may be processed by the program 140 including instructions. The data processed by the program 140 may be transmitted through the communication module 190, and the data received through the communication module 190 may be processed by the program 140.

According to an embodiment, the program 140 may include an application layer 310, a framework layer 320, and a kernel 340. The program 140 may be referred as software or a module.

According to an embodiment, the application layer 310 may include the application 146 of FIG. 1. For example, the application layer 310 may include a contact application or a call application. The application layer 310 may perform a function to provide a user with various services (e.g., an Internet multimedia subsystem (IMS) service, an Internet service, or the like) provided from an external network (e.g., the external server 290 of FIG. 2). In FIG. 3, for convenience of description, only a first application 311 and a second application 313 are illustrated, but the application layer 310 may include a plurality of applications.

According to an embodiment, the framework layer 320 may perform data transmission for transmitting data associated with an IMS service or an Internet service to the communication module 190. The framework layer 320 may include a connectivity manager 323, a cellular framework module 325, and a Wi-Fi framework module 326. The framework layer 320 may further include other components such as telephony, IMS, and radio interface layer (RIL), in addition to the components illustrated in FIG. 3.

According to an embodiment, the connectivity manager 323 may manage the wireless connection or direct connection between the electronic device 101 and an external electronic device (e.g., the electronic device 102, the electronic device 104, or the server 108 of FIG. 1). The connectivity manager 323 may monitor and manage a network connection (e.g., Wi-Fi, general packet radio system (GPRS), universal mobile telecommunication system (UMTS), long term evolution (LTE), or fifth generation (5G)). For example, the connectivity manager 323 may monitor and manage a cellular network connection (e.g., GPRS, UMTS, LTE or 5G), using the cellular framework module 325. For example, the connectivity manager 323 may monitor and manage a Wi-Fi network connection using the Wi-Fi framework module 326.

According to an embodiment, the kernel 340 may control and/or manage system resources (e.g., the processor 120, the communication module 190, and/or the memory 130 of FIG. 1) used to execute an operation or function implemented by the application of the application layer 310 and the framework layer 320. The kernel 340 may provide an interface capable of controlling or managing the system resources, by accessing a separate component of the electronic device 101.

According to an embodiment, the connectivity manager 323 may manage a connection per each application. For example, the connectivity manager 323 may differently set a network associated with the first application 311 and a network associated with the second application 313. According to an embodiment, when the data transmission event associated with the first application 311 occurs, the connectivity manager 323 may determine whether to transmit data over the currently connected network (e.g., the Wi-Fi network 232 of FIG. 2). For example, the connectivity manager 323 may determine whether data transmission is possible, based on service restriction information. When the data transmission is possible, the connectivity manager 323 may set the currently connected network to the default network of the first application 311. For example, the default network may mean a network having the highest priority. For example, the default network may mean a network in which the data is capable of being transmitted or received first when the data of the related application (e.g., the first application 311) is transmitted or received. When the port associated with data to be transmitted is restricted by the connected network, the connectivity manager 323 may determine that it is impossible to transmit the data over the currently connected network. In this case, the connectivity manager 323 may determine whether it is possible to transmit the data over another network (e.g., the cellular network 231 of FIG. 2). When the data associated with the first application 311 is capable of being transmitted over another network, the connectivity manager 323 may set the other network to the default network of the first application 311. In a similar manner, the default network associated with the second application 313 may be set.

According to various embodiments, the connectivity manager 323 may control a connection using network information associated with each application. According to an embodiment, the connectivity manager 323 may control the connection associated with the first application 311, based on the priority of a network set for the first application 311. For example, the connectivity manager 323 may transmit or receive data associated with the first application 311 using the network (e.g., the default network) with the highest priority among networks designated to the first application 311. When the transmission or reception fails, the connectivity manager 323 may attempt to transmit or receive data using a network with the next order designated to the first application 311. For another example, the connectivity manager 323 may transmit or receive data associated with the first application 311 using a network, which is available and which has the highest priority, from among networks designated to the first application 311.

According to an embodiment, the connectivity manager 323 may differently set a default network associated with the first application 311 and a default network associated with the second application 313. For example, the connectivity manager 323 may generate, manage, update, and/or store default network information about at least one application. The connectivity manager 323 may generate and manage a database in which an identifier (e.g., unique identifier) associated with each application is mapped to network information. According to an embodiment, the network information may include at least one of default network information (e.g., a network type (e.g., 3GPP or IEEE)), a network identifier (e.g., a service set identifier (SSID)), or service information (e.g., port information of the related application).

According to an embodiment, the Wi-Fi framework module 326 may be configured to manage Wi-Fi connection and communication and to control the first communication module 203 (e.g., the first communication module 203 of FIG. 2). For example, the Wi-Fi framework module 326 may include a port detector service 331, a Wi-Fi traffic poller 333, and a Wi-Fi state machine 335. The Wi-Fi framework module 326 may further include components not illustrated in FIG. 3.

According to an embodiment, the port detector service 331 may determine whether the service (e.g., a network port) requested by an application is available. The Wi-Fi traffic poller 333 may identify a Wi-Fi traffic state and may generate statistical information associated with the Wi-Fi traffic. The Wi-Fi state machine 335 may be configured to detect an event associated with Wi-Fi and to transition a Wi-Fi state in response to the detected event.

According to an embodiment, the port detector service 331 may determine whether the port requested by an application is available. According to an embodiment, the port detector service 331 may determine whether the port is available, based on the response from the server (e.g., the first server 280 of FIG. 2) associated with a Wi-Fi network (e.g., the Wi-Fi network 232 of FIG. 2). For example, the port detector service 331 may determine whether the corresponding port is available, by analyzing a response packet to transmission control protocol (TCP) communication with the related server (e.g., the first server 280 of FIG. 2). For another example, the port detector service 331 may determine whether the corresponding port is available, based on whether a response is received within a specified time in the related server (e.g., the first server 280 of FIG. 2).

According to various embodiments, the electronic device 101 may be connected to the Wi-Fi network 232 and may be connected to the cellular network 231 simultaneously or substantially simultaneously. For example, the connectivity manager 323 may be configured such that the application corresponding to a specified port (e.g., the port blocked in the Wi-Fi network 232) uses the specified port of the cellular network 231 instead of the Wi-Fi network 232.

According to an embodiment, when the Wi-Fi function of the electronic device 101 is activated, the Wi-Fi framework module 326 and the port detector service 331 and the Wi-Fi traffic poller 333 included in the Wi-Fi framework module 326 may be activated. As the Wi-Fi function is activated, the electronic device 101 may detect a signal of a first AP (e.g., the first AP 202 of FIG. 2) having a connection to an Internet network (e.g., the Internet network 205 of FIG. 2) and may be connected to the first AP, automatically or by the selection of a user. The data traffic between the Wi-Fi network 232 and the electronic device 101 may occur, while the electronic device 101 is connected to Wi-Fi network (e.g., the Wi-Fi network 232 of FIG. 2) or after the connection. The Wi-Fi traffic poller 333 may detect the data traffic and may control the port detector service 331 to obtain service restriction information associated with the first AP 202. For example, the port detector service 331 may transmit a signal (e.g., a session connection request) of the port associated with the data to be transmitted, to the Wi-Fi network 232 and may determine whether the corresponding port is available, based on the response thereof. When it is impossible to use the corresponding port, the port detector service 331 may request the Wi-Fi state machine 335 to disconnect the currently connected first AP 202 and to disable the Wi-Fi function.

According to an embodiment, the Wi-Fi state machine 335 may set or maintain the state of the Wi-Fi function to a state (e.g., connected mode) indicating a connection to the first AP 202, in response to a request for disabling the Wi-Fi function and may transmit an event indicating that the current network state is changed, to the connectivity manager 323. When the event is received, the connectivity manager 323 may disconnect the Wi-Fi network 232 and may connect to a network (e.g., the cellular network 231 of FIG. 2) of a lower priority. For example, priorities of a plurality of networks may be stored in a memory (e.g., the memory 130 of FIG. 2) or may be a value set by a user. Accordingly, while maintaining the Wi-Fi connection to the first AP 202, the electronic device 101 may transmit or receive data corresponding to the port blocked in the first AP 202, over the network of the lower priority.

Figure 4:
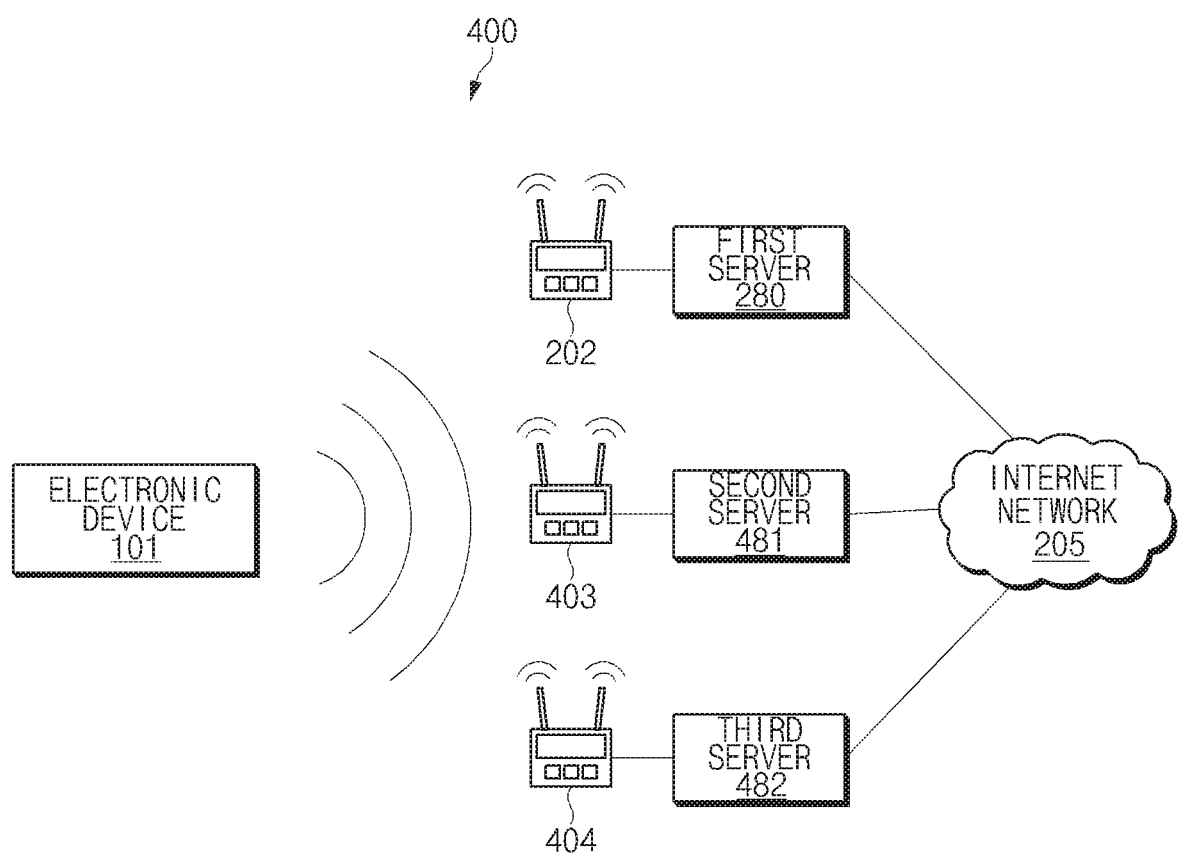
FIG. 4 illustrates an environment in which service restriction information is obtained according to various embodiments of the disclosure.

FIG. 4 illustrates an environment in which service restriction information is obtained according to various embodiments of the disclosure.

Referring to FIG. 4, a plurality of APs (e.g., the first AP 202, a second AP 403, and a third AP 404) associated with different servers are illustrated in an environment 400. The plurality of APs (e.g., the first AP 202, the second AP 403, and the third AP 404) may be an AP configured to transmit or receive a signal in accordance with a Wi-Fi protocol.

For example, the first AP 202 may be connected to the Internet network 205 over the first server 280; the second AP 403 may be connected to the Internet network 205 over a second server 481; and the third AP 404 may be connected to the Internet network 205 over a third server 482. An embodiment is exemplified in FIG. 4 as a single server is associated with a single AP. However, a single server may be associated with a plurality of APs.

According to an embodiment, the first server 280, the second server 481, and the third server 482 may have different service restriction settings from each other. For example, the first port blocked by the first server 280 may be different from the second port blocked by the second server 481 or the third port blocked by the third server 482. For example, the electronic device 101 may perform efficient wireless connection setup by managing service restriction information associated with each AP.

According to an embodiment, the electronic device 101 may receive the identification information of an AP, from each AP. For example, the electronic device 101 may obtain identification information (e.g., SSID and/or basic SSID (BSSID)) of the first AP 202 by receiving a beacon signal from the first AP 202. For another example, the electronic device 101 may transmit a probe request to the second AP 403 and may obtain identification information of the second AP 403 by receiving a probe response from the second AP 403.

According to an embodiment, the electronic device 101 may perform the connection to a single AP using the identification information received from each AP. For example, the electronic device 101 may be connected to the first AP 202. According to an embodiment, the electronic device 101 may obtain service restriction information associated with the first AP 202, by transmitting a packet including port information to the first AP 202. The electronic device 101 may obtain service restriction information associated with the second AP 403 and the third AP 404, in the similar manner.

According to an embodiment, the electronic device 101 may receive service restriction information associated with each AP, from each AP. For example, each AP may be configured to broadcast or advertise the service restriction information associated with each AP.

According to an embodiment, the electronic device 101 may generate data including identification information of each AP and service restriction information associated with each AP. For example, the electronic device 101 may generate data including identification information (e.g., SSID and/or BSSID) of the first AP 202 and service restriction information (e.g., restricted application information and/or restricted port information) associated with the first AP 202. For example, the service restriction information may further include the rating for the first AP 202, the service quality state of the first AP 202, and/or the security state of the first AP 202. The electronic device 101 may generate service restriction information about each AP and may store the generated data in a memory (e.g., the memory 130 of FIG. 1). For example, the electronic device 101 may obtain the service restriction information based on a method described with reference to FIGS. 5 and 6.

Figure 5:
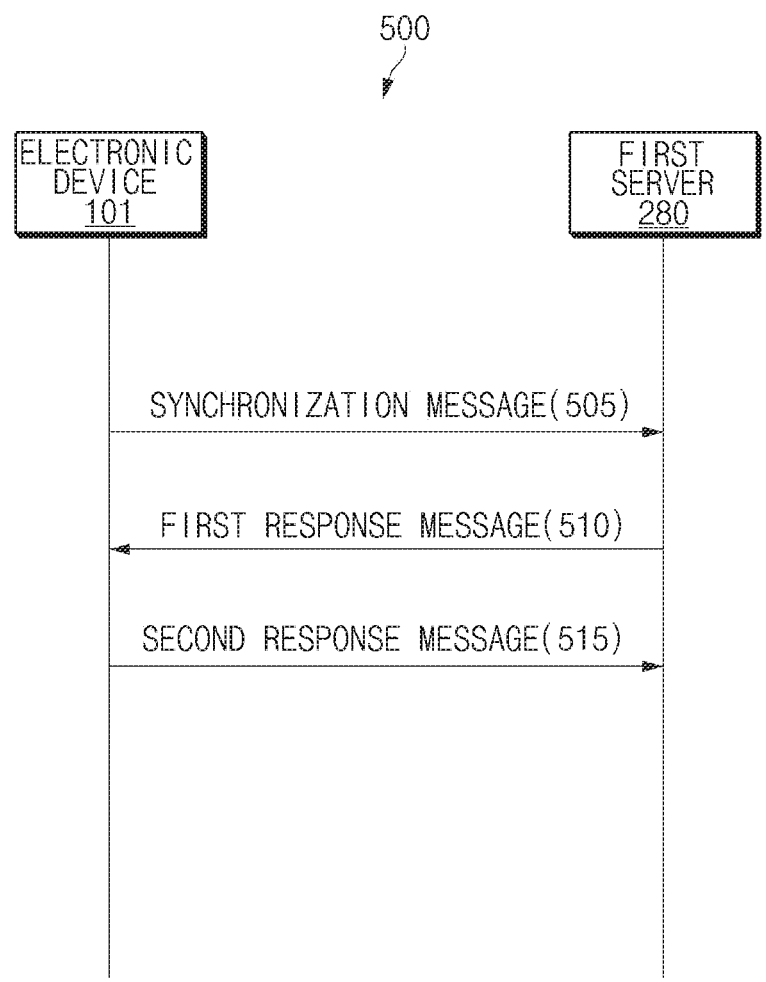
FIG. 5 illustrates a flowchart of a method of obtaining service restriction information according to an embodiment of the disclosure.

FIG. 5 illustrates a flowchart of a method for obtaining service restriction information according to various embodiments of the disclosure.

According to an embodiment, an electronic device (e.g., the electronic device 101 of FIG. 2) may transmit a packet including the protocol data unit (PDU) generated in accordance with TCP. The PDU may include a TCP header; for example, the TCP header may include destination port information. The destination port information includes port information used for the application making a request for data transmission and may be information indicating through which port in the receiver terminal the corresponding PDU is transmitted. For example, the TCP header may include a control flag field for logical TCP control and data management. The control flag field may be composed of six bits, and the six bits may indicate 'finish', 'synchronized', 'reset', 'push', 'acknowledgment', and 'urgent', respectively. The 'finish' may mean a connection finish request and may mean that there is no data to be transmitted anymore. The 'synchronized' may mean a connection request and may be first transmitted in the establishment procedure of a TCP session. The 'reset' may indicate the reset of a session and may mean an abnormal session disconnection. The 'push' may be set for data requiring a quick response. The 'acknowledgment' may indicate that a packet from a counterpart has been received successfully. The 'urgent' may indicate urgent data with high priority.

According to an embodiment, the electronic device 101 may perform 3-way handshake for TCP connection. The 3-way handshake may be performed to establish the logical connection between a transmitter terminal (e.g., the electronic device 101) and a receiver terminal (e.g., the first server 280). For example, the 3-way handshake may mean the procedure of establishing a session between the transmitter terminal and the receiver terminal before transmission of data.

Referring to FIG. 5, in operation 505 of flowchart 500, the electronic device 101 may transmit a synchronization message to the first server 280. For example, the control flag field of the TCP header of the synchronization message may be set to 'synchronized'. In operation 510, the electronic device 101 may receive a first response message as the response to the synchronization message. In a normal case, the first response message may include a TCP header indicating 'synchronized' and 'acknowledgment'. In operation 515, the electronic device 101 may transmit a second response message as the response to the first response message. The second response message may include a TCP header indicating 'acknowledgment'. The electronic device 101 may establish the TCP connection to the first server 280, through the 3-way handshake.

According to various embodiments, the electronic device 101 may determine whether a specific port is blocked using the procedure of the 3-way handshake. For example, the electronic device 101 may request (e.g., operation 505) a packet (e.g., a packet including the TCP header in which a TCP control flag field is set to 'synchronized' and in which destination port information is set to the specific port) for requesting the service associated with the specific port and may determine whether the specific port is blocked, based on the response thereto. For example, when the specific port is allowed in the first server 280, the electronic device 101 may receive a message indicating 'acknowledgment' as a response to the requested service. For example, when the specific port is blocked in the first server 280, the electronic device 101 may fail to receive the response to the requested service within a specified time or may receive a response in which another TCP control flag field other than 'acknowledgment' is set.

According to an embodiment, in operation 510, the electronic device 101 may receive a first response message indicating 'reset' and 'acknowledgment'. In this case, the electronic device 101 may determine whether a port or an application associated with the synchronization message transmitted in operation 505 is blocked in the first server 280. According to an embodiment, when the first response message is not received within a specified time after operation 505, the electronic device 101 may determine whether the port or the application associated with the transmitted synchronization message is blocked in the first server 280. According to an embodiment, when the first response message indicating 'reset' and 'acknowledgment' is received in operation 510, the electronic device 101 may not perform operation 515. According to an embodiment, when the first response message indicating 'reset' and 'acknowledgment' is received in operation 510, in operation 515, the electronic device 101 may transmit the second response message indicating 'reset', to the first server 280.

Figure 6:
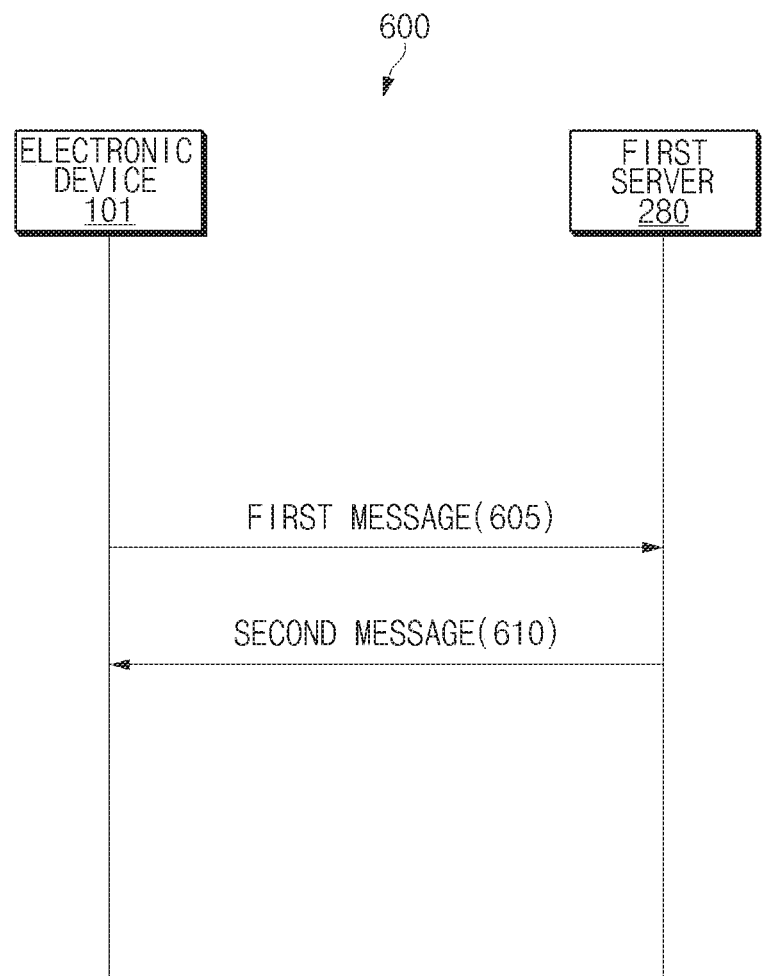
FIG. 6 illustrates another flowchart of a method of obtaining service restriction information according to an embodiment of the disclosure.

FIG. 6 illustrates another flowchart of a method of obtaining service restriction information according to an embodiment of the disclosure.

According to various embodiments, an electronic device (e.g., the electronic device 101 of FIG. 2) may determine whether a specific port is blocked in the first server 280, by transmitting another packet instead of a packet indicating 'synchronized'.

Referring to FIG. 6, in operation 605 of flowchart 600, the electronic device 101 may transmit a first message including specific port information to the first server 280. For example, the TCP control flag field of the first message may indicate 'finish'. For another example, all flags of the TCP control flag field of the first message may be set (e.g., all bit values indicate '1') or any flag may not be set (e.g., all bit values indicate '0'). When the specific port is blocked in the first server 280, in operation 610, the electronic device 101 may receive the second message indicating 'reset', from the first server 280. Accordingly, the electronic device 101 may determine whether the specific port is blocked in the first server, by receiving the second message from the first server 280. When the specific port is allowed in the first server 280, the first server 280 may not transmit any response. In this case, operation 610 may be skipped.

According to an embodiment, in operation 605, the electronic device 101 may transmit a first message including specific port information to the first server 280. For example, the TCP control flag field of the first message may indicate 'acknowledgment'. When the specific port is allowed in the first server 280, in operation 610, the electronic device 101 may receive the second message indicating 'reset', from the first server 280. When the specific port is blocked in the first server 280, in operation 610, the electronic device 101 may receive a second message indicating 'reset' and 'acknowledgment', from the first server 280. Accordingly, the electronic device 101 may determine whether the specific port is blocked in the first server, by receiving the second message from the first server 280.

According to an embodiment, in operation 605, the electronic device 101 may transmit a first message including specific port information to the first server 280. For example, the first message may mean ping to the first server 280. When the specific port is allowed in the first server 280, in operation 610, the electronic device 101 may receive the second message indicating 'reset', from the first server 280. When the specific port is blocked in the first server 280, operation 610 may be skipped. For example, when the second message indicating 'reset' is not received from the first server 280 within a specified time in operation 605, the electronic device 101 may determine whether the specific port is blocked in the first server 280.

Figure 7:
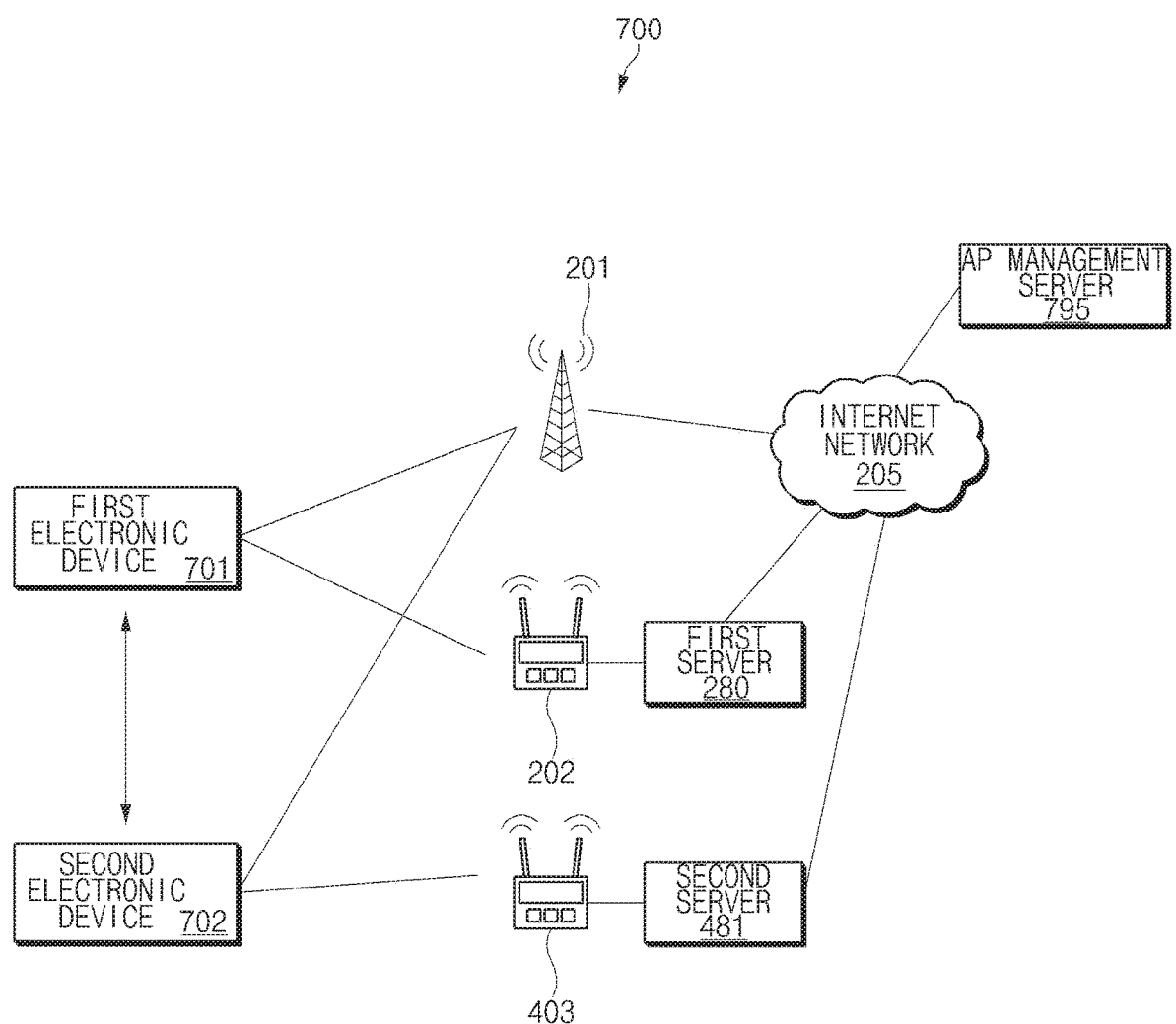
FIG. 7 illustrates an environment in which service restriction information is shared according to various embodiments of the disclosure.

FIG. 7 illustrates an environment in which service restriction information is shared according to various embodiments of the disclosure.

Referring to FIG. 7, each of a first electronic device 701 and a second electronic device 702 in an environment 700 may be an electronic device having the same configuration as the electronic device 101 of FIG. 2. According to an embodiment, the first electronic device 701 may obtain service restriction information associated with the first AP 202 and the second AP 403. For example, the first electronic device 701 may obtain the service restriction information using the method described with reference to FIGS. 3 to 6. According to an embodiment, the first electronic device 701 and the second electronic device 702 may obtain the service restriction information, when an AP (e.g., the first AP 202 or the second AP 403) is connected or when a specified event (e.g., data transmission associated with a specified application (e.g., a messenger application) or a specified port, the execution of a specified application, or the foreground operation of a specified application) occurs. According to an embodiment, the first electronic device 701 may obtain the service restriction information about all ports associated with all ports (e.g., all ports corresponding to applications installed in the first electronic device 701) associated with the first electronic device 701 using the method described with reference to FIGS. 3 to 6. According to an embodiment, the first electronic device 701 may obtain the service restriction information associated with a specified at least one port using the method described with reference to FIGS. 3 to 6. According to an embodiment, the first electronic device 701 may obtain the service restriction information about only at least one port of the application of the first electronic device 701 among the specified plurality of ports using the method described with reference to FIGS. 3 to 6. According to an embodiment, the first electronic device 701 may obtain the service restriction information about a port associated with data to be transmitted currently. According to an embodiment, the first electronic device 701 may transmit the obtained service restriction information to an AP management server 795. For example, when the service restriction information is updated, the first electronic device 701 may transmit the service restriction information to the AP management server 795. For example, the first electronic device 701 may transmit the service restriction information to the AP management server 795, at a specified period or based on a user request.

According to an embodiment, the second electronic device 702 may receive the service restriction information from the AP management server 795. For example, the second electronic device 702 may perform AP search, may transmit the query to the AP found using the AP management server 795, over the Internet network 205 (e.g., the base station 201 or the second AP 403), and may receive the service restriction information associated with the found AP from the AP management server 795. The second electronic device 702 may provide a user with the service restriction information associated with the found AP or may control a network connection using the service restriction information. According to an embodiment, the second electronic device 702 may display the related service restriction information on a display (e.g., the display 260 of FIG. 2) together with the AP scan result.

According to an embodiment, the first electronic device 701 may transmit the service restriction information to the second electronic device 702. For example, the first electronic device 701 may transmit the service restriction information, based on the request from the second electronic device 702. The first electronic device 701 may transmit the service restriction information to the second electronic device 702 using Wi-Fi direct, near field communication (NFC), ZigBee, Bluetooth, device-to-device (D2D) communication, or infrared communication.

Figure 8:
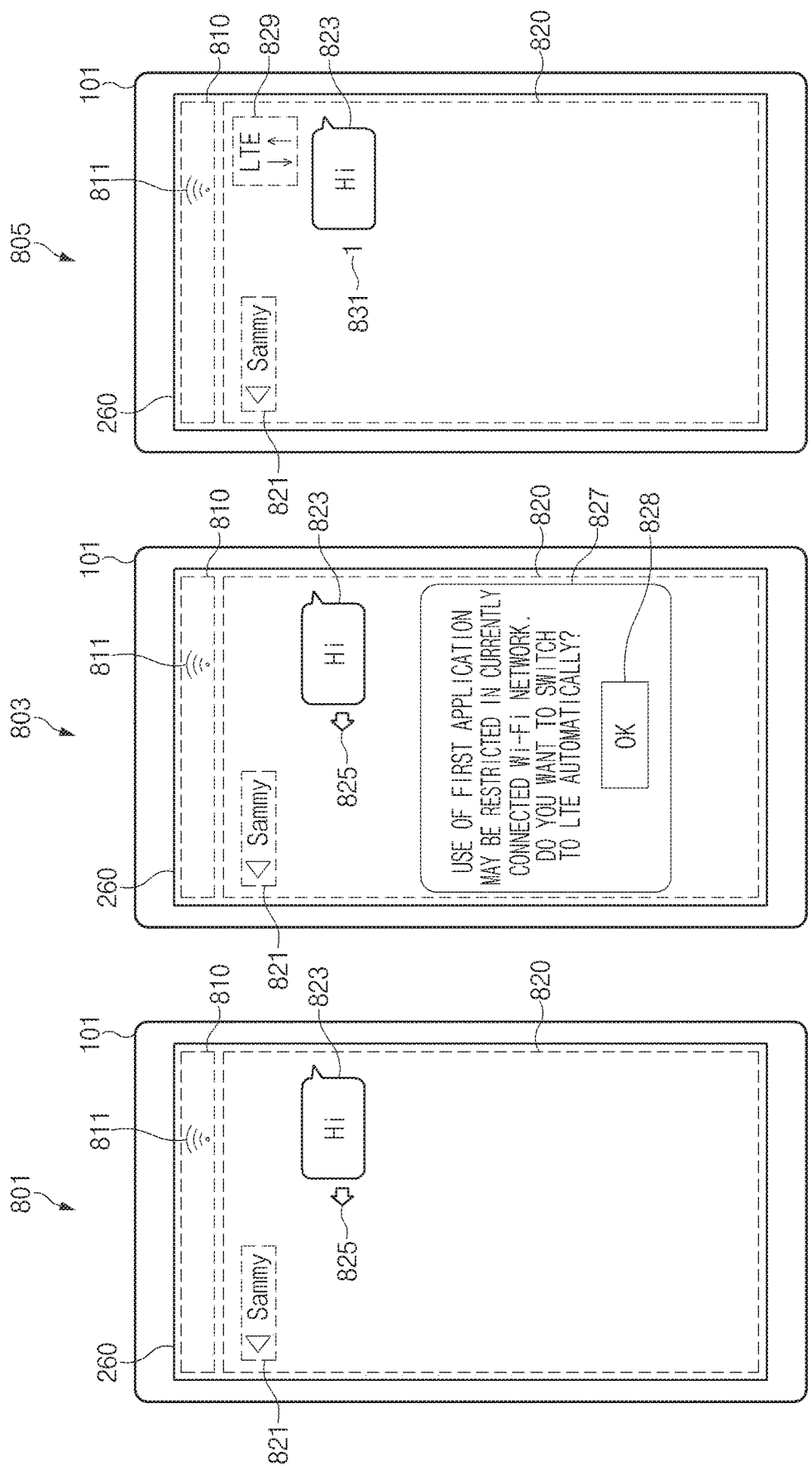
FIG. 8 illustrates a network switch user interface (UI) according to various embodiments of the disclosure.

FIG. 8 illustrates a network switch UI according to various embodiments of the disclosure.

Referring to FIG. 8, for example, it is assumed that an electronic device (e.g., the electronic device 101 of FIG. 2) is connected to a Wi-Fi network (e.g., the Wi-Fi network 232 of FIG. 2). According to an embodiment, the electronic device 101 may display information about the currently connected network, in a specific region of a display (e.g., the display 260 of FIG. 2). For example, the electronic device 101 may display a Wi-Fi icon 811 indicating that the electronic device 101 is connected to the Wi-Fi network on a state UI 810 (e.g., a state bar).

According to an embodiment, the electronic device 101 may display a messenger UI 820 corresponding to a messenger application in at least part of the region of the display 260. For example, the electronic device 101 may display the messenger UI 820 on the display 260, based on a user input (e.g., a user input to a messenger application icon) indicating the execution of the messenger application.

Referring to reference numeral 801, the electronic device 101 may attempt to transmit a message, based on a user input. For example, the messenger UI 820 may include counterpart information 821 and an input message 823. A transmission indicator 825 may indicate that the input message 823 is being transmitted.

Because the electronic device 101 is connected to the Wi-Fi network, the electronic device 101 may attempt to transmit the input message 823 over the Wi-Fi network. For example, the messenger application may be configured to use a specified port (e.g., 80, 443, 8080, 5223, 5228, 9282, and/or 10000 to 10010). In an embodiment, at least one port associated with the messenger application may be blocked in the Wi-Fi network to which the electronic device 101 is connected. For example, the electronic device 101 may determine that the port associated with the messenger application is blocked in the currently connected AP, based on the response from the Wi-Fi network associated with the transmission of the input message 823 or based on the service restriction information received from an external server (e.g., the AP management server 795 of FIG. 7).

Referring to reference numeral 803, the electronic device 101 may display a network switch notification 827 on the display 260. For example, when a port (e.g., all ports associated with a messenger application, at least one port associated with a messenger application, or a port of messenger-related data to be transmitted currently) associated with a messenger application (e.g., an application executed in foreground) currently executed is blocked in the currently connected Wi-Fi network (e.g., a main network), the electronic device 101 may display a network switch notification 827. For example, the network switch notification 827 may include information indicating the switch to another network (e.g., a cellular network or a wireless network through another AP) different from the currently connected network. For example, the network switch notification 827 may be a pop-up message. According to an embodiment, the network switch notification 827 may include an OK button 828 for a user's consent. According to an embodiment, even when there is another available network (e.g., a network in which a port associated with a running application is allowed), the electronic device 101 may the network switch notification 827.

According to an embodiment, when the port associated with the messenger application is blocked in the currently connected Wi-Fi network, the electronic device 101 may transmit the message 823 entered over another network. For example, the electronic device 101 may transmit the message 823 entered over another network, based on a user input to the OK button 828.

Referring to reference numeral 805, the electronic device 101 may display a transmission indicator 831 on the messenger UI 820, as the transmission of the input message 823 is completed. According to an embodiment, when the electronic device 101 uses another network because the port associated with the messenger application is blocked in the currently connected Wi-Fi network, the electronic device 101 may provide a UI indicating another network in at least part of the region of the display 260. According to an embodiment, the electronic device 101 may display an LTE icon 829 on the messenger UI 820. For example, information (e.g., the LTE icon 829) about another network that the messenger application currently uses may be displayed in the form of a floating UI. Because the electronic device 101 transmits or receives the data associated with the messenger application over the LTE network while maintaining the connection to the Wi-Fi network, a Wi-Fi icon 811 may be maintained in the state UI 810. According to an embodiment, the LTE icon 829 may be displayed only while the messenger application operates in foreground (e.g., while the messenger UI 810 is displayed on the display 260).

According to an embodiment, when a user input to an image (e.g., the LTE icon 829) for displaying information about another network is received, the electronic device 101 may provide a network connection UI (not illustrated). For example, the network connection UI may include a selection menu for disconnection or connection network switch and connection control.

The configuration of the UI in FIG. 8 is exemplary, and the type of UI of the disclosure is not limited thereto. For example, in reference numeral 805, the LIE icon 829 may be displayed on the state UI 810, not the messenger UI 820. For example, the LTE icon 829 and the Wi-Fi icon 811 may be displayed at the same time. According to an embodiment, the LTE icon 829 corresponding to the backup connection may flicker. According to an embodiment, the LTE icon 829 is the exemplification of other network information, and the other network information may include information indicating the type (e.g., Wi-Fi or LTE) of a network and information indicating the quality (e.g., reception signal strength).

Figure 9:
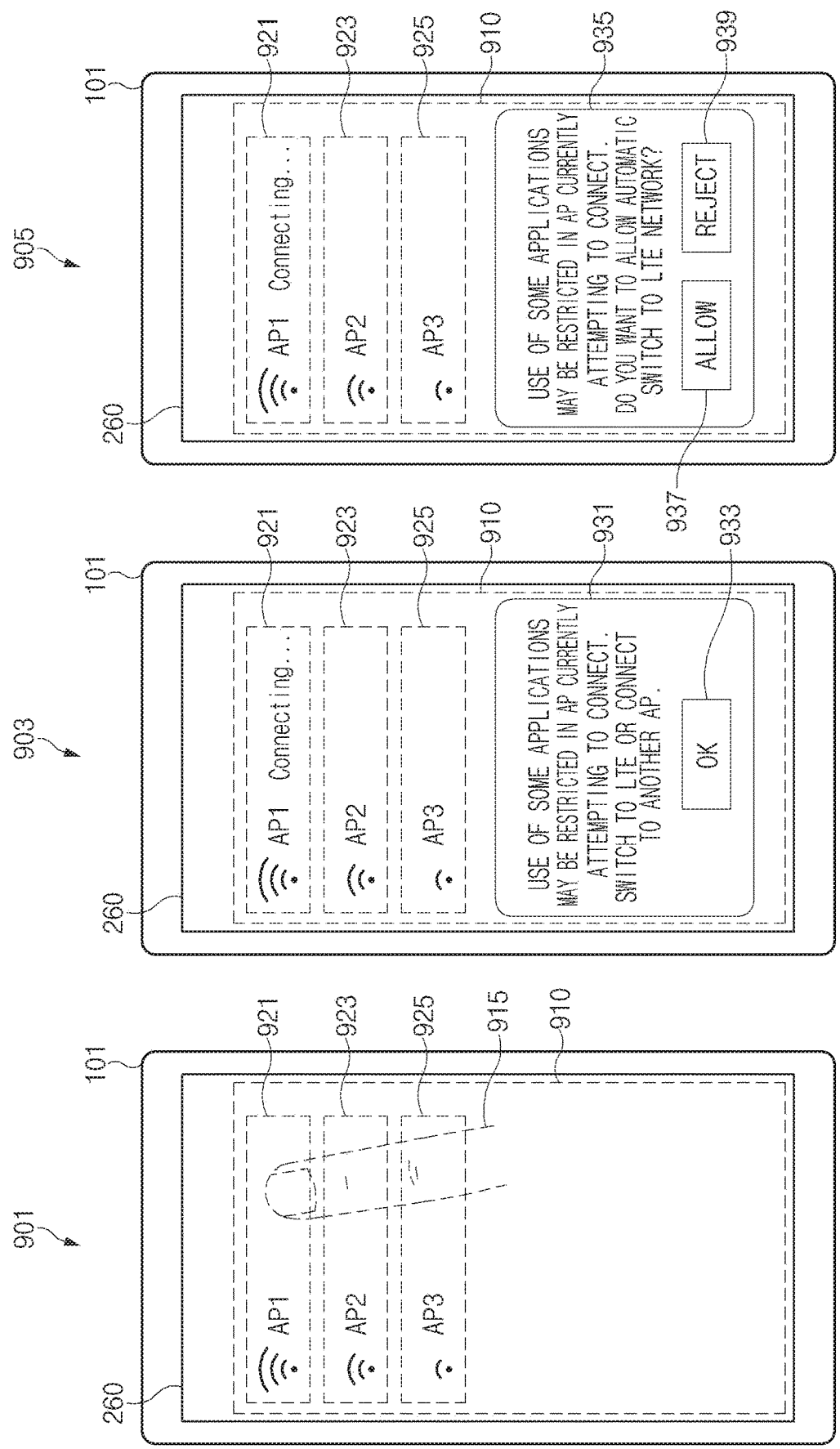
FIG. 9 illustrates examples of a network information providing UI according to various embodiments of the disclosure.

FIG. 9 illustrates examples of a network information providing UI according to various embodiments of the disclosure.

Referring to FIG. 9, an electronic device (e.g., the electronic device 101 of FIG. 2) may display an AP list UI 910 including the AP scan result, in the specific region of a display (e.g., the display 260 of FIG. 2). For example, the electronic device 101 may obtain information (e.g., SSID) associated with at least one AP by receiving a probe response or a beacon signal from at least one AP and may display information associated with the obtained at least one AP, in the AP list UI 910.

Referring to reference numeral 901, the electronic device 101 may find a first AP AP1, a second AP AP2, and a third AP AP3 through AP scan and may display information about the found first AP, the found second AP, and the found third AP in the AP list UI 910. According to an embodiment, the electronic device 101 may display a first AP selection UI 921 including first AP information, a second AP selection UI 923 including second AP information, and a third AP selection UI 925 including third AP information, in the AP list UI 910. For example, the electronic device 101 may receive a user input 915 to the first AP selection UI 921.

Referring to reference numeral 903, the electronic device 101 may attempt to connect to the first AP, in response to a user input 915. Information indicating that the connection to the first AP is attempted may be displayed in the first AP selection UI 921. According to an embodiment, the electronic device 101 may obtain service restriction information associated with at least the first AP using at least one of the methods described with reference to FIGS. 3 to 7. For example, the electronic device 101 may obtain service restriction information associated with the first AP, during the AP scan. For another example, when the user input 915 is received, the electronic device 101 may obtain the service restriction information of the AP (e.g., the first AP) corresponding to the user input 915.

According to an embodiment, when the selected first AP is an AP in which some types of services are restricted, the electronic device 101 may provide a service restriction notification 931, based on the service restriction information of the first AP. For example, the service restriction notification 931 may include service restriction information (e.g., at least one of restricted application information, restricted port information, or partial service restriction guide information) of the AP attempting the connection and/or guide information of the connection to another network. The service restriction notification 931 may include an OK button 933 for determining whether the user agrees with that or whether the user recognizes that. For example, the service restriction notification 931 may be provided in a pop-up message. According to an embodiment, the service restriction notification 931 may be provided during a specified time.

Referring to reference numeral 905, according to an embodiment, when the connection to an AP (e.g., the first AP) in which some services is restricted is attempted depending on the user input 915 of reference numeral 901, the electronic device 101 may provide a network switch setting UI 935. For example, the network switch setting UI 935 may include service restriction information, guide information of the setting of switch to another network, an allowance button 937, and a rejection button 939. According to an embodiment, when a user input to the allowance button 937 is received, the electronic device 101 may perform a connection to the selected first AP and may control the connection to use another available network (e.g., the cellular network) without an additional consent procedure, with regard to the restricted service. For example, the network switch setting UI 935 may have the form of a pop-up message.

The service restriction notification 931 and the network switch setting UI 935 illustrated in FIG. 9 are exemplary, and the types of the illustrated service restriction notification 931 and the illustrated network switch setting UI 935 are not limited to the exemplification illustrated in FIG. 9. According to an embodiment, the illustrated service restriction notification 931 and the illustrated network switch setting UI 935 may include guide information about network switch. According to an embodiment, the service restriction notification 931 and the network switch setting UI 935 may include information about a method (e.g., the network switch UI described with reference to FIG. 8) of displaying a UI during network switch (e.g., network switch due to restricted service usage). For example, the service restriction notification 931 and the network switch setting UI 935 may include information (e.g., an image and/or a text-based guide) indicating that information (e.g., the LTE icon 829) about the switched network is displayed while the network switch is performed.

Figure 10:
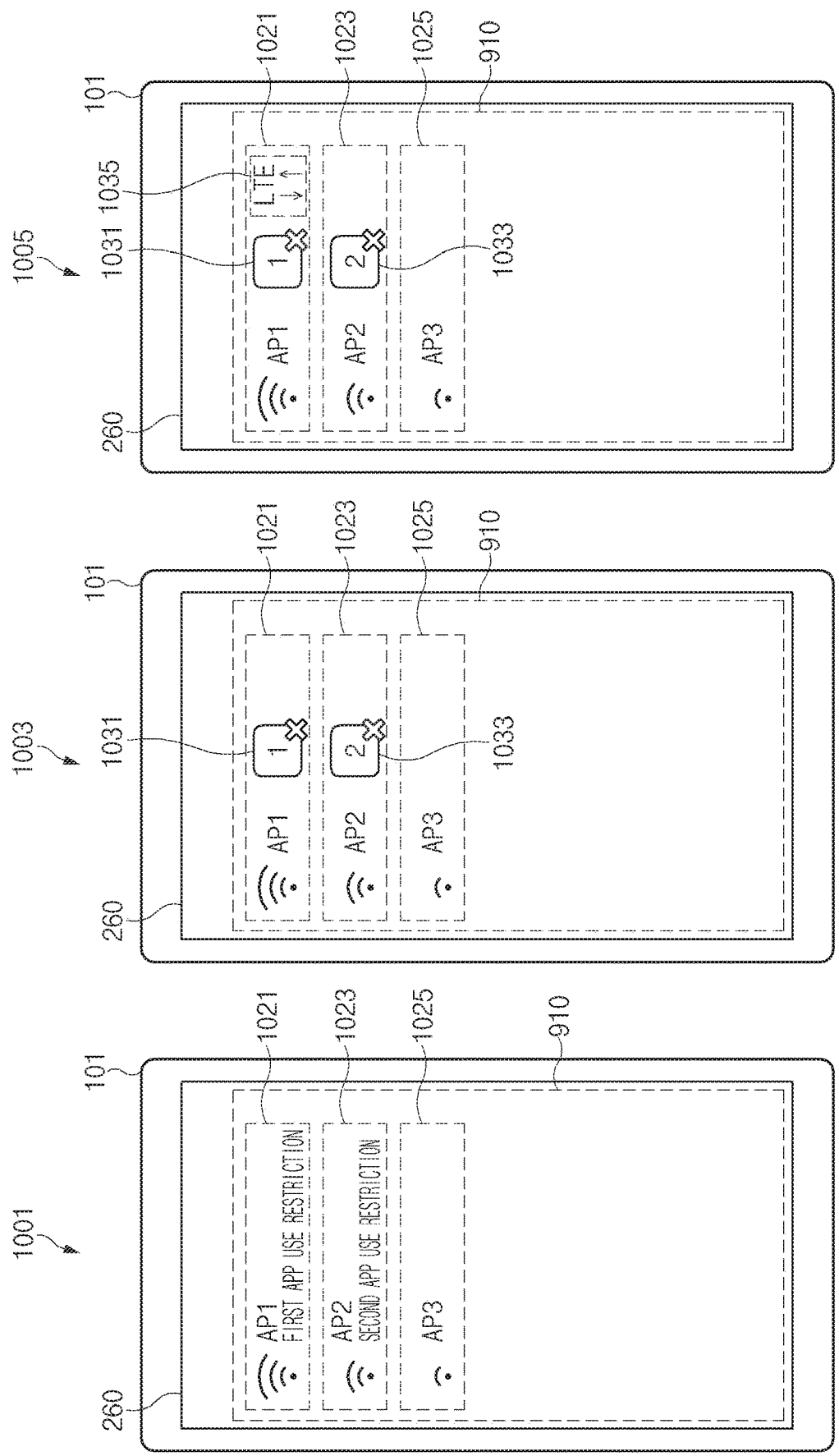
FIG. 10 illustrates other examples of a network information providing UI according to various embodiments of the disclosure.

FIG. 10 illustrates other examples of a network information providing UI according to various embodiments of the disclosure.

Referring to FIG. 10, an electronic device (e.g., the electronic device 101 of FIG. 2) may display an AP list UI (e.g., the AP list UI 910 of FIG. 9) including at least one AP selection UI, in a specific region of a display (e.g., the display 260 of FIG. 2). For example, in displaying the AP selection UI, the electronic device 101 may display the service restriction information of the associated AP together. According to an embodiment, the service restriction information may mean information about an application, the service of which is restricted, from among a plurality of applications installed in the electronic device 101. According to an embodiment, the service restriction information may mean information about an application, the service of which is restricted, from among at least one specified application or at least one user-defined application. For example, the specified application may mean an application frequently utilized by a user or an application based on the user's pattern. For another example, the user-defined application may mean at least one application selected based on a user input or user selection.

Referring to reference numeral 1001, according to an embodiment, the electronic device 101 may display first AP information (e.g., SSID and reception signal strength indicator) and service restriction information (e.g., restriction application information) associated with the first AP, in a first AP selection UI 1021. The electronic device 101 may display second AP information and service restriction information associated with the second AP, in a second AP selection UI 1023. When the service restriction information associated with the third AP AP3 is not present, the electronic device 101 may display only third AP information, in a third AP selection UI 1025. According to an embodiment, the electronic device 101 may transmit a query to each AP to an external server (e.g., the AP management server 795 of FIG. 7) and may obtain service restriction information by receiving the service restriction information associated with at least one AP among each AP from the external server. The service restriction information is illustrated in reference numeral 1001 in the form of a text. However, the form of the service restriction information is not limited thereto.

Referring to reference numeral 1001, the list of AP selection UIs 1021, 1023, and 1025 has been arranged based on the signal strength of an AP, in the AP list UI 910. However, the arrangement of the AP selection UI in the AP list UI 910 of the disclosure is not limited thereto. According to an embodiment, the AP selection UIs 1021, 1023, and 1025 may be arranged based on the service restriction information in the AP list UI 910. For example, the third AP selection UI 1025 with no service restriction may be displayed in order (e.g., the higher location in the AP list UI 910) higher than the first AP selection UI 1021 and the second AP selection UI 1023. According to an embodiment, the AP selection UIs 1021, 1023, and 1025 may be arranged in the AP list UI 910 based on the service restriction information and the signal strength. For example, the third AP selection UI 1025 with no service restriction may be displayed at the uppermost location in the AP list UI 910; the AP with service restriction may be displayed based on the signal strength in order of the first AP selection UI 1021 and the second AP selection UI 1023.

Referring to reference numeral 1003, according to an embodiment, the electronic device 101 may display the service restriction information in an AP selection UI in the form of an image. For example, the electronic device 101 may display a first service restriction image 1031 indicating that the usage of the first application is restricted, in the first AP selection UI 1021. For example, a first service restriction image 1031 may be an image generated from the image (e.g., the icon image of the first application) associated with the first application. The electronic device 101 may generate the first service restriction image 1031 by adding at least one additional image (e.g., an arbitrary image indicating that the usage is impossible) to the image associated with the first application. Similarly, the electronic device 101 may display a second service restriction image 1033 associated with the second AP, in a second AP selection UI 1023.

Referring to reference numeral 1005, according to an embodiment, the electronic device 101 may display network switch setting information about each AP, together with the service restriction information. For example, the network switch according to partial service restriction has been set for the first AP in advance. In this case, the electronic device 101 may display a network switch icon 1035 indicating that the network switch settings for the first AP is applied, in the first AP selection UI 1021. According to an embodiment, when the service restriction information is present, the electronic device 101 may provide a UI for enabling or disabling a function to switch a network. For example, even when the network switch setting for the first AP is enabled, the electronic device 101 may display a network switch icon 1035. The network switch icon 1035 of FIG. 10 may be exemplary, and the network switch icon 1035 may be an icon indicating a type (e.g., 3GPP network or IEEE network) of secondary network.

Figure 11:
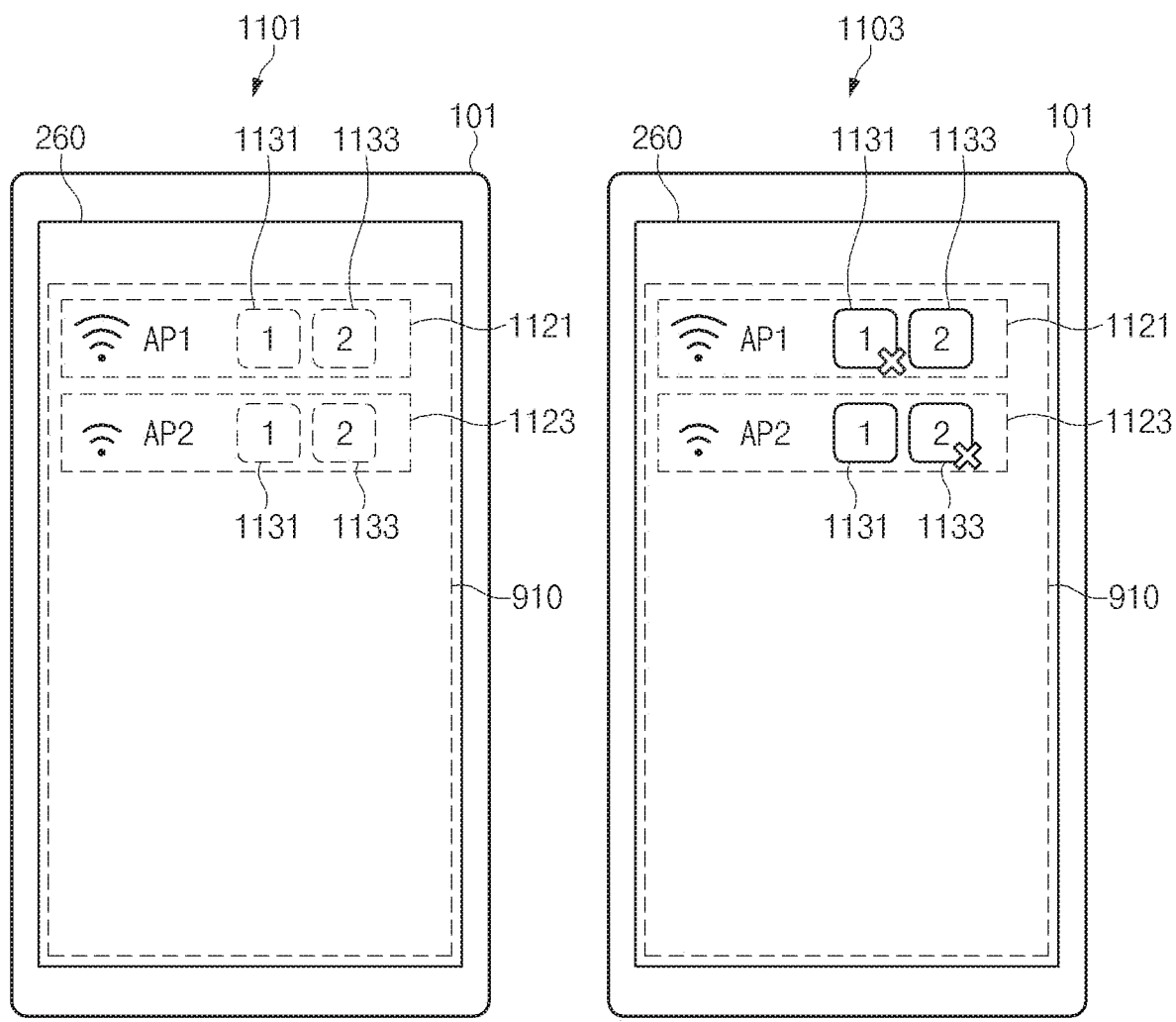
FIG. 11 illustrates still other examples of a network information providing UI according to various embodiments of the disclosure.

FIG. 11 illustrates still other examples of a network information providing UI according to various embodiments of the disclosure.

Referring to FIG. 11 and reference numeral 1101, the electronic device 101 may display the AP list UI 910 including the first AP selection UI 1121 and the second AP selection UI 1123, in the specific region of the display 260. According to an embodiment, when obtaining service restriction information about each AP, the electronic device 101 may display the service restriction information in a first state. For example, the electronic device 101 may display a first application image 1131 and a second application image 1133 in the first state. For example, the first state may mean that the image is displayed with more than the specified transparency and/or with less than the specified saturation or the image is displayed in a flickering state. For example, each of the first application and the second application may be a preset application, the application installed in the electronic device 101 among preset applications, an application, which uses the specified type (e.g., a messenger) or a specified port and which is installed in the electronic device 101, an application operating (e.g., operating in foreground or background) currently in the electronic device 101, or an application with high usage frequency among applications installed in the electronic device 101.

Referring to reference numeral 1103, according to an embodiment, when the service restriction information associated with each AP is obtained, the electronic device 101 may display the service restriction information in a second state or a third state, based on the obtained service restriction information. For example, the second state may mean that a specified service is allowed, and the third state may mean that a specified service is blocked. The second state and the third state may mean that the image is displayed with less than the specified transparency and/or with more than the specified saturation. For example, with regard to the first AP, when the first application service is blocked and the second application service is allowed, the electronic device 101 may display a first application image 1131 in the third state in the first AP selection UI 1121 and may display a second application image 1133 in the second state in the first AP selection UI 1121. For another example, with regard to the second AP, when the second application service is blocked and the first application service is allowed, the electronic device 101 may display the first application image 1131 in the second state in the second AP selection UI 1123 and may display the second application image 1133 in the third state in the second AP selection UI 1123.

Figure 12:
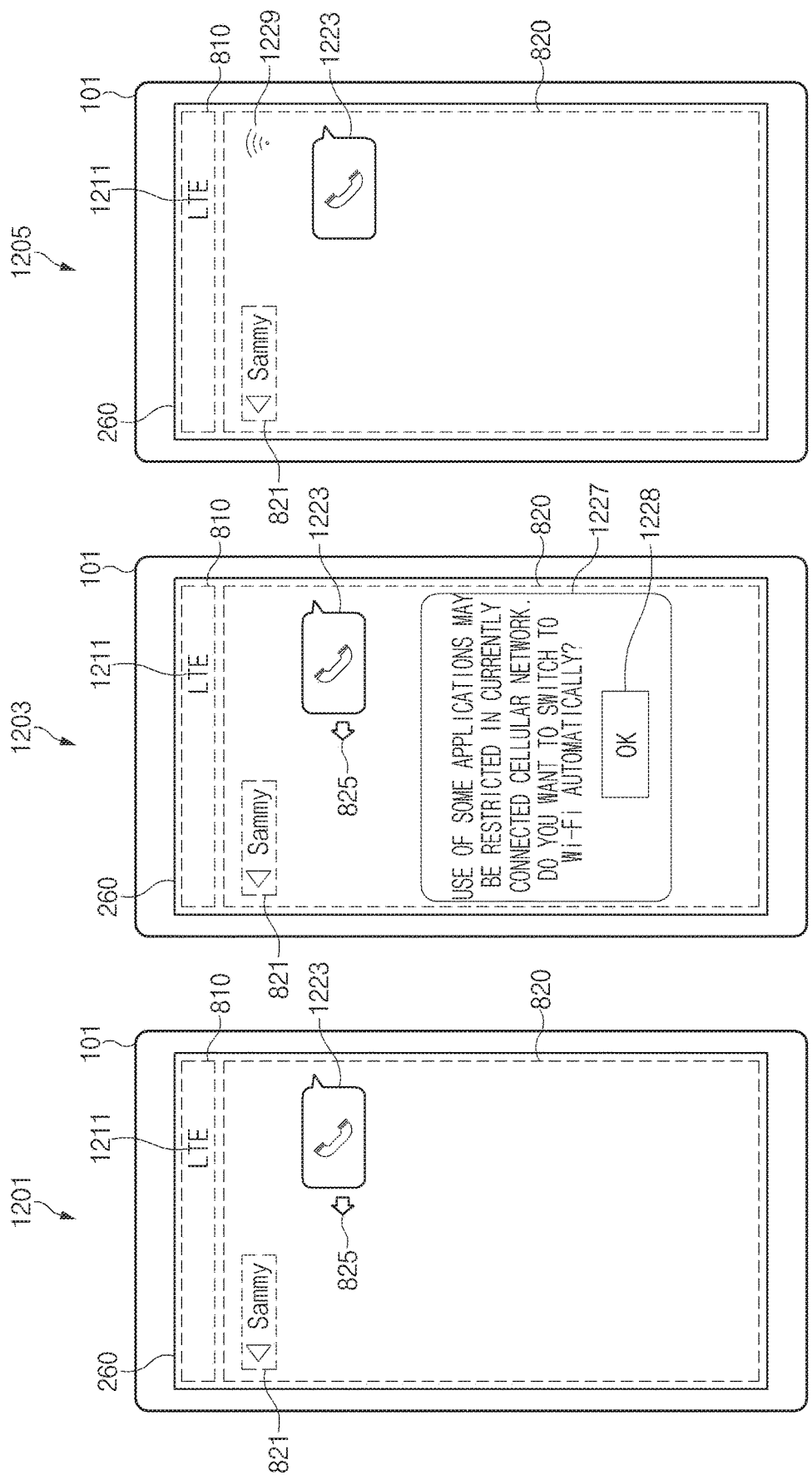
FIG. 12 illustrates another exemplification of a network switch UI according to various embodiments of the disclosure.

FIG. 12 illustrates another exemplification of a network switch UI according to various embodiments of the disclosure.

With regard to FIGS. 8 to 10, embodiments are described assuming that an electronic device (e.g., the electronic device 101 of FIG. 2) is connected to a Wi-Fi network (e.g., the Wi-Fi network 232 of FIG. 2). Even when the electronic device 101 is connected to a cellular network (e.g., the cellular network 231 of FIG. 2), the above-described embodiments may be applied similarly. For example, the electronic device 101 may be connected to a cellular network, and some services (e.g., some ports) may be restricted in the cellular network. For example, according to the policy of a mobile network operator (MNO), the cellular network may restrict a voice over Internet protocol (VoIP) service through the cellular network of a specific application (e.g., a messenger application), with respect to a specific user (e.g., a user that selects a specific billing policy).

Referring to FIG. 12 and reference numeral 1201, it is assumed that the electronic device 101 is connected to a cellular network (e.g., LTE network). According to an embodiment, the electronic device 101 may display an LTE icon 1211 displaying the currently connected network, in a state UI (e.g., the state UI 810 of FIG. 8). The descriptions about other components having the same reference numeral may be referenced by the description associated with FIG. 8. According to an embodiment, as the VoIP function of a messenger application is activated, the electronic device 101 may display a call message 1223 indicating a VoIP call, in a messenger UI 820.

Referring to reference numeral 1203, when the VoIP function is restricted in the cellular network, the electronic device 101 may provide a network switch notification 1227. For example, the network switch notification 1227 may include an OK button 1228 for receiving a user's consent, as a pop-up message. The network switch notification 1227 may include information associated with service restriction and/or guide information about switch network. According to an embodiment, the network switch notification 1227 may be provided even when there is an available access point in the electronic device 101.

Referring to reference numeral 1205, when the electronic device 101 uses another network (e.g., Wi-Fi network) because the VoIP service is blocked in the currently connected cellular network, the electronic device 101 may provide a UI indicating another network, in at least part of the region of the display 260. According to an embodiment, the electronic device 101 may display a Wi-Fi icon 1229 on the messenger UI 820. For example, information (e.g., the Wi-Fi icon 1229) about another network currently used by the messenger application may be displayed in the form of a floating UI. Because the electronic device 101 transmits or receives the data associated with the messenger application over another network (e.g., Wi-Fi network) while maintaining the connection to the cellular network, the cellular network icon 1211 may be maintained in the state UI 810. According to an embodiment, the Wi-Fi icon 1229 may be displayed only while the messenger application operates in foreground (e.g., while the messenger UI 810 is displayed on the display 260).

According to an embodiment, when a user input to an image (e.g., the Wi-Fi icon 1229) for displaying information about another network is received, the electronic device 101 may provide a network connection UI (not illustrated). For example, the network connection UI may include a selection menu for disconnection or connection network switch and connection control.

The configuration of the UI in FIG. 12 is exemplary, and the type of UI of the disclosure is not limited thereto.

Figure 13:
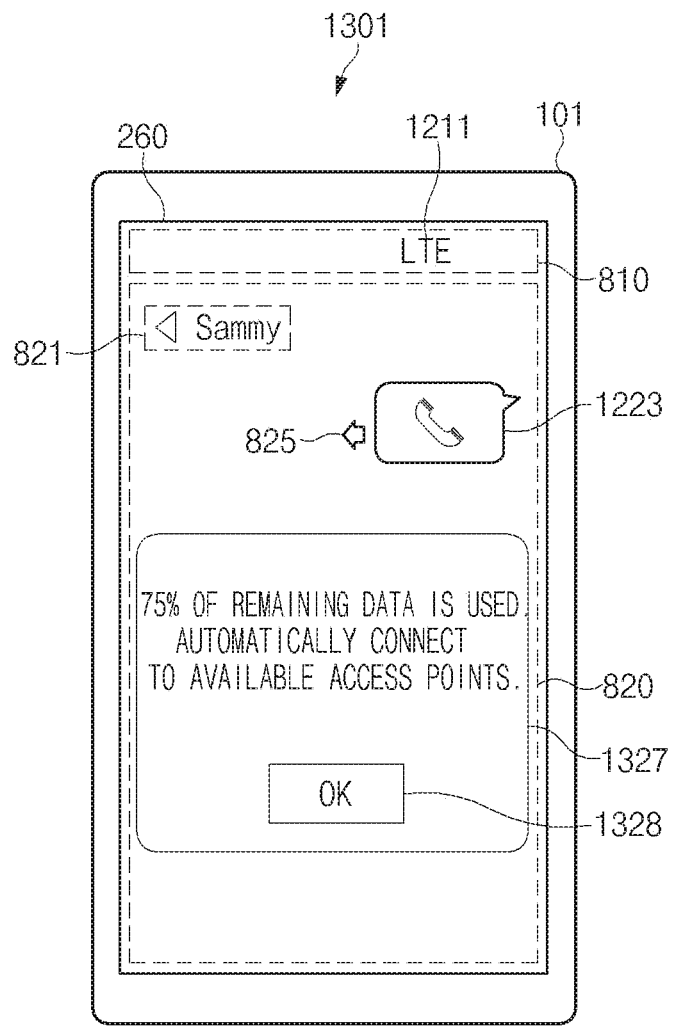
FIG. 13 illustrates still another exemplification of a network switch UI according to various embodiments of the disclosure.

FIG. 13 illustrates still another exemplification of a network switch UI according to various embodiments of the disclosure.

Referring to FIG. 13 and reference numeral 1301, a network switch notification 1327 is illustrated. In FIG. 13, the descriptions about the reference numeral having the same number may be referenced by the description associated with FIG. 12.

According to various embodiments, an electronic device (e.g., the electronic device 101 of FIG. 2) may provide a network switch notification 1327, based on billing information. For example, the electronic device 101 may be connected to a cellular network (e.g., the cellular network 231 of FIG. 2), and the cellular network may allow a VoIP service through a messenger application. According to an embodiment, even though the corresponding service is not restricted in the currently connected cellular network, the electronic device 101 may provide the network switch notification 1327, based on billing information. For example, the electronic device 101 may obtain the billing information (e.g., tariff information) associated with the electronic device 101 from the cellular network. The billing information may include information associated with the remaining data amount for the current electronic device 101. According to an embodiment, when the remaining data amount is less than a specified ratio or a specified amount, the electronic device 101 may display the network switch notification 1327 on the display 260. For example, the network switch notification 1327 may include information associated with the remaining data amount, information associated with network switch, and/or an OK button 1328 for receiving the user's consent. According to an embodiment, the network switch notification 1327 may be provided in the form of a pop-up message.

Figure 14:
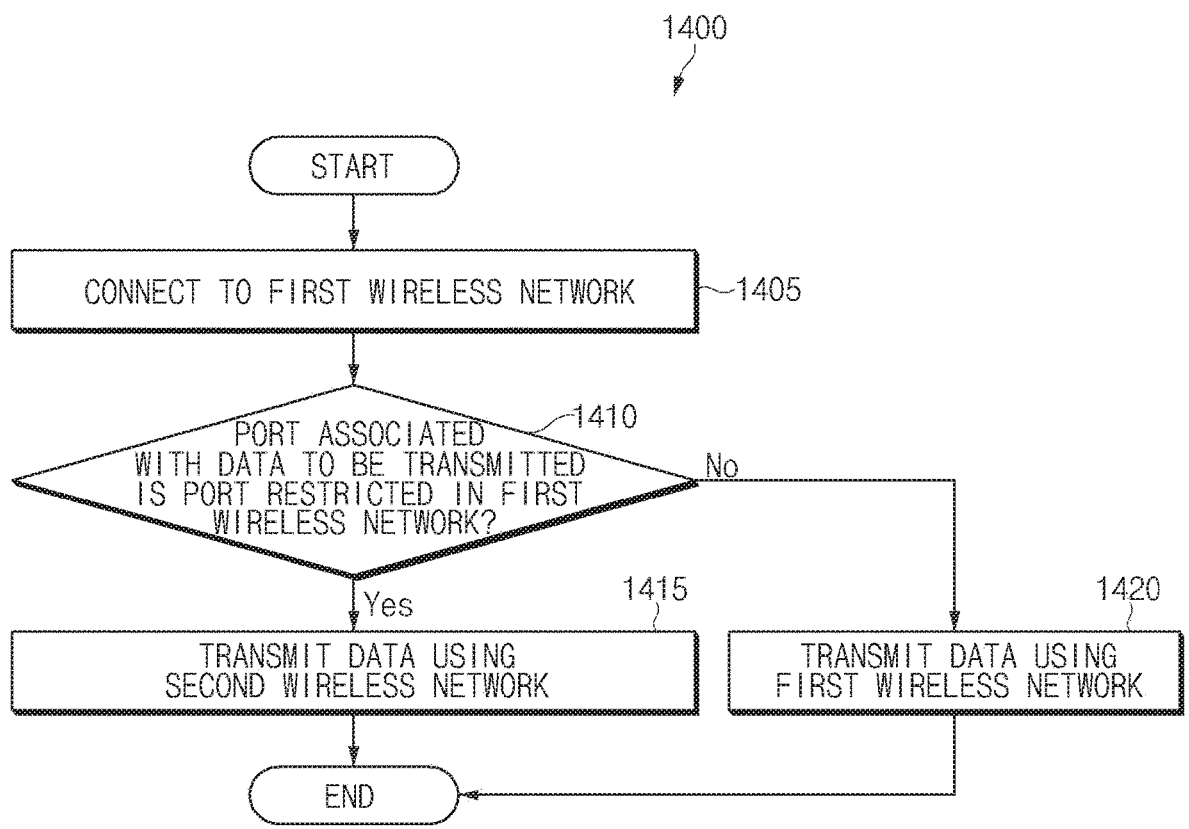
FIG. 14 is a flowchart of a data transmission method according to various embodiments of the disclosure.

FIG. 14 is a flowchart of a data transmitting method according to various embodiments of the disclosure.

Referring to FIG. 14, in operation 1405 of flowchart 1400, an electronic device (e.g., the electronic device 101 of FIG. 2) may connect to a first wireless network. For example, when the first wireless network is a Wi-Fi network, the electronic device 101 may connect to the first wireless network using a first communication module (e.g., the first communication module 203 of FIG. 2). According to an embodiment, the electronic device 101 may display an image (e.g., the Wi-Fi icon 811 of FIG. 8) corresponding to the first wireless network, on a display (e.g., the display 260 of FIG. 2).

According to various embodiments, in operation 1410, the electronic device 101 may determine whether the port associated with data to be transmitted is a port restricted in the first wireless network. For example, the electronic device 101 may obtain service restriction information associated with the first wireless network using at least one of the methods described with reference to FIGS. 3 to 7. The electronic device 101 may determine whether the data to be transmitted is a port restricted in the first wireless network, based on the service restriction information.

According to various embodiments, when the port associated with data to be transmitted is restricted in the first wireless network, in operation 1415, the electronic device 101 may transmit data using a second wireless network. For example, the second wireless network may be a cellular network. According to an embodiment, when the port associated with data to be transmitted is restricted in the first wireless network, the electronic device 101 may display a notification of service restriction and/or a notification of network switch, on the display 260. According to an embodiment, while transmitting data using the second wireless network, the electronic device 101 may display an image (e.g., the LTE icon 829 of FIG. 8) corresponding to the second wireless network, in at least part of the region of the display 260.

According to various embodiments, when the port associated with data to be transmitted is allowed in the first wireless network, in operation 1420, the electronic device 101 may transmit data using the first wireless network.

In the embodiment of FIG. 14, it is described that the first wireless network is a Wi-Fi network and the second wireless network is a cellular network. The first wireless network and the second wireless network indicate networks different from each other, and the types of the first wireless network and the second wireless network are not limited thereto. According to an embodiment, the first wireless network may be a cellular network, and the second wireless network may be a Wi-Fi network. According to an embodiment, the first wireless network may be a Wi-Fi network, and the second wireless network may be a Wi-Fi network different from the first wireless network. According to an embodiment, the first wireless network may be a Wi-Fi network, and the second wireless network may be a virtual private network (VPN). For example, when the specific port is not allowed in the first server 280, the electronic device 101 may be connected to the first server 280 through VPN equipment. According to an embodiment, the first wireless network may be a cellular network, and the second wireless network may be a VPN. For example, when a service (e.g., VoIP) via a specific port is restricted, the electronic device 101 may provide the corresponding service (e.g., VoIP) through VPN equipment.

Figure 15:
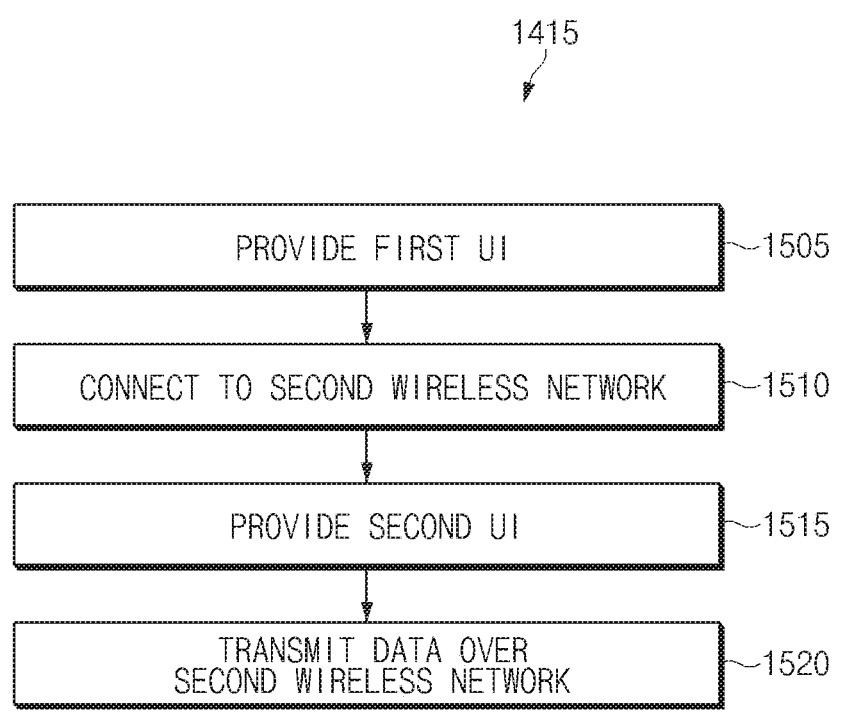
FIG. 15 is a flowchart of a data transmitting method over a second wireless network according to various embodiments of the disclosure.

FIG. 15 is a flowchart of a data transmitting method over a second wireless network according to various embodiments of the disclosure.

Referring to FIG. 15, the operations of FIG. 15 may be referred to as operation 1415 of FIG. 14. For example, operation 1505 to operation 1520 of FIG. 15 may be operations included in operation 1415 of FIG. 14.

According to various embodiments, in operation 1505, an electronic device (e.g., the electronic device 101 of FIG. 2) may provide a first UI (e.g., the network switch notification 827 of FIG. 8, the service restriction notification 931 of FIG. 9, the network switch setting UI 935 of FIG. 9, or the network switch notification 1227 of FIG. 12) associated with service restriction in a first wireless network. For example, the first UI may include information about restriction service and/or information for guiding the switch to another network.

According to various embodiments, in operation 1510, the electronic device 101 may connect to the second wireless network. For example, the electronic device 101 may establish the connection to the second wireless network. When the second wireless network is a cellular network, the electronic device 101 may connect to the second wireless network using a second communication module (e.g., the second communication module 204 of FIG. 2).

According to various embodiments, in operation 1515, the electronic device 101 may provide a second UI (e.g., the LTE icon 829 of FIG. 8 or the Wi-Fi icon 1229 of FIG. 12). For example, the second UI may be a UI indicating information about the second wireless network. For example, when the second wireless network is an LTE network, the electronic device 101 may provide the second UI including an image indicating an LTE communication network.

According to various embodiments, in operation 1520, the electronic device 101 may transmit data over the second wireless network. For example, while maintaining the connection to the first wireless network, the electronic device 101 may transmit data over the second wireless network. According to an embodiment, the electronic device 101 may display the first UI and the second UI on a display (e.g., the display 260 of FIG. 2) at the same time.

Figure 16:
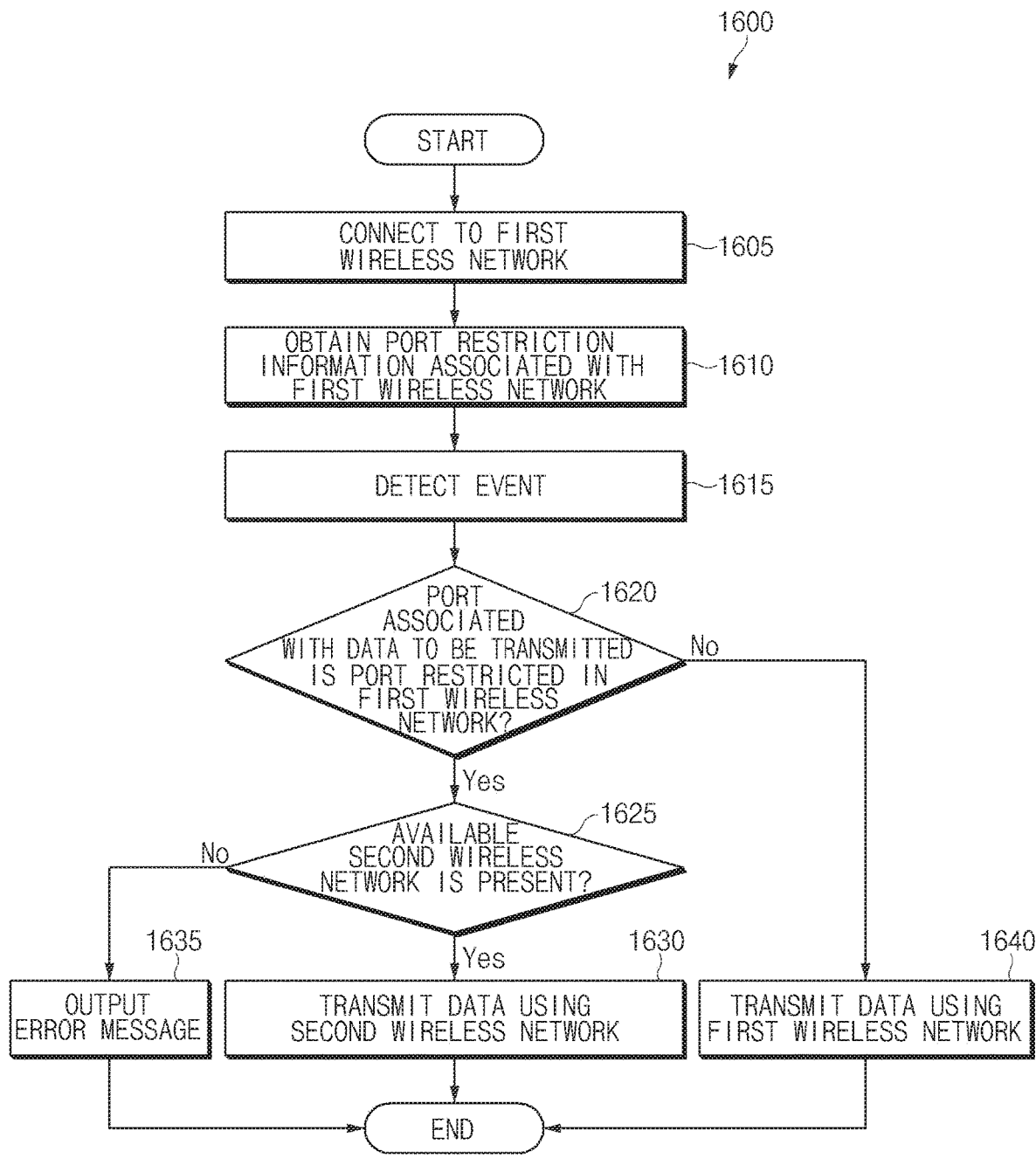
FIG. 16 is a flowchart of a data transmitting method based on port restriction information according to various embodiments of the disclosure.

FIG. 16 is a flowchart of a data transmitting method based on port restriction information according to various embodiments of the disclosure.

Referring to FIG. 16, in operation 1605, an electronic device may connect to a first wireless network. The description about operation 1605 may be referenced by the description associated with operation 1405 of FIG. 14. For convenience of description, the redundant description will be omitted.

According to various embodiments, in operation 1610, an electronic device (e.g., the electronic device 101 of FIG. 2) may obtain port restriction information (e.g., service restriction information) associated with a first wireless network (e.g., Wi-Fi network). For example, the electronic device 101 may obtain port restriction information using at least one of the methods described with reference to FIGS. 3 to 7.

According to various embodiments, in operation 1615, the electronic device 101 may detect an event associated with data transmission. For example, the electronic device 101 may detect the data transmission event associated with the specific application. According to an embodiment, operation 1615 may be performed, substantially at the same time with operation 1610 or before operation 1610.

According to various embodiments, in operation 1620, the electronic device 101 may determine whether the port associated with data to be transmitted is a port restricted in the first wireless network. The description about operation 1620 may be referenced by the description associated with operation 1410 of FIG. 14.

According to various embodiments, when the port associated with data to be transmitted is a port allowed in the first wireless network, in operation 1640, the electronic device 101 may transmit data using the first wireless network.

According to various embodiments, when the port associated with data to be transmitted is a port restricted in the first wireless network, in operation 1625, the electronic device 101 may determine whether an available second wireless network is present. For example, when the data to be transmitted uses a port restricted in the first wireless network, the electronic device 101 may search for the second wireless network in which a port associated with the data to be transmitted is allowed. For example, the electronic device 101 may determine whether the port associated with the data to be transmitted is allowed in another connectable AP or cellular network. When the available second wireless network is present, the electronic device 101 may transmit data using the second wireless network depending on operation 1630. The description about operation 1630 may be referenced by the description associated with operation 1415 of FIG. 14. When the available second wireless network is not present, the electronic device 101 may output an error message depending on operation 1635.

According to various embodiments, an electronic device (e.g., the electronic device 101 of FIG. 2) may include a first wireless communication circuit (e.g., the first communication module 203 of FIG. 2) communicating with a first wireless network (e.g., the Wi-Fi network 232 of FIG. 2) based on a first communication protocol, a second wireless communication circuit (e.g., the second communication module 204 of FIG. 2) communicating with a second wireless network (e.g., the cellular network 231 of FIG. 2) based on a second communication protocol, a display (e.g., the display 260 of FIG. 2), a processor (e.g., the processor 120 of FIG. 2) operatively connected to the first wireless communication circuit, the second wireless communication circuit, and the display, and a memory (e.g., the memory 130 of FIG. 2) electrically connected to the processor. The memory may store instructions that cause the processor to connect to the first wireless network using the first wireless communication circuit, obtain service restriction information associated with the first wireless network, determine whether a service associated with data is restricted in the first wireless network using the service restriction information, and maintain a connection to the first wireless network to transmit the data over the second wireless communication network using the second wireless communication circuit when the service associated with the data is restricted in the first wireless network.

In an embodiment, the instructions may cause the processor to determine whether the service associated with the data is restricted in the first wireless network, by comparing a port associated with the data with a blocked port included in the service restriction information.

In an embodiment, the instructions may cause the processor to transmit a packet including a TCP header including a control flag field of a specified value, to the first wireless network; and obtain the service restriction information based on a response of the first wireless network to the packet.

In an embodiment, the instructions may cause the processor to display a first UI (e.g., the Wi-Fi icon 811 of FIG. 8 or the LTE icon 1211 of FIG. 12) corresponding to the first wireless network, on at least part of the display when being connected to the first wireless network, and display a second UI (e.g., the LTE icon 829 of FIG. 8 or the Wi-Fi icon 1229 of FIG. 12) corresponding to the second wireless network, on at least part of the display while transmitting the data over the second network.

In an embodiment, the instructions may cause the processor to display a notification (e.g., the network switch notification 827 of FIG. 8, the service restriction notification 931 of FIG. 9, the network switch setting UI 935 of FIG. 9, or the network switch notification 1227 of FIG. 12) indicating a switch to the second wireless network, on at least part of the display, when the service associated with the data is restricted in the first wireless network.

In an embodiment, the service restriction information may include identification information of at least one access point and block port information associated with the at least one access point.

In an embodiment, the first wireless network may be a Wi-Fi network, and the second wireless network may be a cellular network.

In an embodiment, the instructions may cause the processor to store network connection information about at least some applications of a plurality of applications stored in the memory.

According to various embodiments, a data transmitting method of an electronic device may include connecting (e.g., operation 1605 of FIG. 16) to a first wireless network using a first wireless communication circuit of the electronic device supporting a first wireless communication protocol, obtaining (e.g., operation 1610 of FIG. 16) service restriction information associated with the first wireless network, determining (e.g., operation 1620 of FIG. 16) whether a service associated with data is restricted in the first wireless network using the service restriction information, and when the service associated with the data is restricted in the first wireless network, maintaining (e.g., operation 1630 of FIG. 16) a connection to the first wireless network to transmit the data over a second wireless network by using a second wireless communication circuit of the electronic device supporting a second wireless communication protocol.

In an embodiment, in the data transmitting method, the determining of the whether the service associated with data is restricted in the first wireless network may include determining whether the service associated with the data is restricted in the first wireless network, by comparing a port associated with the data with a port blocked based on the service restriction information.

In an embodiment, in the data transmitting method, the obtaining of the service restriction information associated with the first wireless network may include transmitting a packet including a TCP header including a control flag field of a specified value, to the first wireless network and obtaining the service restriction information based on a response of the first wireless network to the packet.

In an embodiment, the data transmitting method may further include displaying a first UI corresponding to the first wireless network, on at least part of a display of the electronic device when being connected to the first wireless network and displaying a second UI corresponding to the second wireless network, on at least part of the display while transmitting the data over the second network.

In an embodiment, the data transmitting method may further include displaying a notification indicating a switch to the second wireless network, on at least part of the display when the service associated with the data is restricted in the first wireless network.

In an embodiment, the service restriction information may include identification information of at least one access point and block port information associated with the at least one access point.

In an embodiment, the first wireless network may be a Wi-Fi network, and the second wireless network may be a cellular network.

According to various embodiments, an electronic device (e.g., the electronic device 101 of FIG. 2) may include a first wireless communication circuit (e.g., the first communication module 203 of FIG. 2) communicating with a first wireless network (e.g., the Wi-Fi network 232 of FIG. 2) based on a first communication protocol, a second wireless communication circuit (e.g., the second communication module 204 of FIG. 2) communicating with a second wireless network (e.g., the cellular network 231 of FIG. 2) based on a second communication protocol, a display (e.g., the display 260 of FIG. 2), a memory (e.g., the memory 120 of FIG. 2), and a processor (e.g., the processor 120 of FIG. 2) operatively connected to the first wireless communication circuit, the second wireless communication circuit, the display, and the memory. For example, the processor may be configured to connect to the first wireless network using the first wireless communication circuit when being connected to the first wireless network, display a first UI (e.g., the Wi-Fi icon 811 of FIG. 8 or the LTE icon 1211 of FIG. 12) corresponding to the first wireless network on at least part of the display, and determine whether a service associated with data to be transmitted is restricted in the first wireless network using service restriction information associated with the first wireless network. When the service associated with the data is restricted in the first wireless network, the processor may be configured to maintain a connection to the first wireless network and transmit the data over the second wireless communication network by using the second wireless communication circuit and while transmitting the data over the second network, display a second UI (e.g., the LTE icon 829 of FIG. 8 or the Wi-Fi icon 1229 of FIG. 12) corresponding to the second wireless network, on at least part of the display.

According to an embodiment, the processor may be configured to display the first UI and the second UI, on at least part of a region of the display while transmitting the data over the second network.

According to an embodiment, the processor may be configured to transmit a packet including a TCP header including a control flag field of a specified value to the first wireless network and obtain the service restriction information based on a response of the first wireless network to the packet.

According to an embodiment, the processor may be configured to display a notification indicating a switch to the second wireless network, on at least part of the display, when the service associated with the data is restricted in the first wireless network.

According to an embodiment, the service restriction information may include identification information of at least one access point and block port information associated with the at least one access point.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, an electronic device may provide seamless data transmission via the allocation of the selective network bearer to the restricted service using service information restricted in the connected network.

Besides, a variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first wireless communication circuit configured to communicate with a first wireless network based on a first communication protocol;
   a second wireless communication circuit configured to communicate with a second wireless network based on a second communication protocol;
   a display;
   at least one processor operatively connected to the first wireless communication circuit, the second wireless communication circuit, and the display; and
   a memory electrically connected to the at least one processor, wherein the memory stores instructions that cause the at least one processor to control to:
     connect to the first wireless network using the first wireless communication circuit,
     obtain service restriction information associated with the first wireless network,
     determine whether a service associated with data of an application is restricted in the first wireless network using the service restriction information, and
     when the service associated with the data is restricted in the first wireless network:
       maintain a connection to the first wireless network,
       display a first indication indicating a connection to the first wireless network on a notification bar,
       transmit the data over the second wireless communication network using the second wireless communication circuit, and
       display a second indication indicating usage of the second wireless network on a user interface of the application only while the application is executed on a foreground and the data is transmitted over the second wireless communication network.

2. The electronic device of claim 1, wherein the instructions further cause the at least one processor to control to:
   determine whether the service associated with the data is restricted in the first wireless network by comparing a port associated with the data with a blocked port included in the service restriction information.

3. The electronic device of claim 1, wherein the instructions further cause the at least one processor to control to:

transmit a packet including a transmission control protocol (TCP) header including a control flag field of a specified value to the first wireless network, and obtain the service restriction information based on a response of the first wireless network to the packet.

4. The electronic device of claim 1, wherein the instructions further cause the at least one processor to control to:

when the service associated with the data is restricted in the first wireless network, display a notification indicating a switch to the second wireless network on the user interface.

5. The electronic device of claim 1, wherein the service restriction information includes identification information of at least one access point and block port information associated with the at least one access point.

6. The electronic device of claim 1, wherein the first wireless network is a Wi-Fi network, and wherein the second wireless network is a cellular network.

7. The electronic device of claim 1, wherein the instructions further cause the at least one processor to control to:

store network connection information about at least some applications of a plurality of applications stored in the memory.

8. A data transmitting method of an electronic device, wherein the method comprises:

connecting to a first wireless network using a first wireless communication circuit of the electronic device supporting a first wireless communication protocol;

obtaining service restriction information associated with the first wireless network;

determining whether a service associated with data of an application is restricted in the first wireless network using the service restriction information; and when the service associated with the data is restricted in the first wireless network, maintaining a connection to the first wireless network, wherein the maintaining the connection to the first wireless network comprises:

displaying a first indication indicating a connection to the first wireless network on a notification bar, transmitting the data over a second wireless network by using a second wireless communication circuit of the electronic device supporting a second wireless communication protocol, and displaying a second indication indicating usage of the second wireless network on a user interface of the application only while the application is executed on a foreground and the data is transmitted over the second wireless communication network.

9. The method of claim 8, wherein the determining of the whether the service associated with data is restricted in the first wireless network comprises:

determining whether the service associated with the data is restricted in the first wireless network by comparing a port associated with the data with a port blocked based on the service restriction information.

10. The method of claim 8, wherein the obtaining of the service restriction information associated with the first wireless network comprises:

transmitting a packet including a transmission control protocol (TCP) header including a control flag field of a specified value to the first wireless network; and obtaining the service restriction information based on a response of the first wireless network to the packet.

11. The method of claim 8, further comprising:

when the service associated with the data is restricted in the first wireless network, displaying a notification indicating a switch to the second wireless network on the user interface.

12. The method of claim 8, wherein the service restriction information includes identification information of at least one access point and block port information associated with the at least one access point.

13. The method of claim 8, wherein the first wireless network is a Wi-Fi network, and wherein the second wireless network is a cellular network.

* * * * *